(12) United States Patent
Russell et al.

(10) Patent No.: US 6,373,826 B1
(45) Date of Patent: Apr. 16, 2002

(54) SPANNING TREE ALGORITHM

(75) Inventors: John Paul Russell, Sawbridgeworth; David Michael Goodman, St. Albans; Christopher David Murton, Chelmsford; Christopher Thomas William Ramsden, Herts, all of (GB); James Shields, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/211,882

(22) Filed: Dec. 15, 1998

(51) Int. Cl.$^7$ ................................................. H04L 12/28
(52) U.S. Cl. .................... 370/256; 370/258; 370/452
(58) Field of Search ................................ 370/222, 227, 370/228, 248, 249, 255, 256, 258, 404, 406, 452, 433

(56) References Cited

U.S. PATENT DOCUMENTS

| | | | | |
|---|---|---|---|---|
| 5,138,615 A | * | 8/1992 | Lamport et al. | ............ 370/400 |
| 5,732,071 A | * | 3/1998 | Saito et al. | ................. 370/255 |
| 5,734,824 A | * | 3/1998 | Choi | ........................... 709/224 |
| 5,841,990 A | * | 11/1998 | Picazo, Jr. et al. | .......... 709/249 |
| 5,867,653 A | * | 2/1999 | Aras et al. | ............. 395/200.34 |
| 5,925,097 A | * | 7/1999 | Gopinath et al. | ........... 709/200 |

OTHER PUBLICATIONS

ANSI/IEEE Std 802.1D, 1993 Edition, pp. 43 to 68, The Spanning Tree Algorithm and Protocol.

* cited by examiner

Primary Examiner—David R. Vincent
(74) Attorney, Agent, or Firm—Lee, Mann, Smith, McWilliams, Sweeney & Ohlson

(57) ABSTRACT

In the situation that data switching is incorporated in a wide area telecommunications network it is advantageous to use a local area network protocol such as ethernet which allows network resources to be shared. However, this introduces a problem with respect to loops in the network and the possibility of infinite packet looping. If the known spanning tree algorithm is used to prevent infinite packet looping this is problematic because the known algorithm takes a relatively long time to take effect. An algorithm is described which is based on assumptions about the topology of the communications network and which is simpler and faster.

19 Claims, 28 Drawing Sheets

EXAMPLE: FIBRE FAILURE IN SIMPLE RING

FOLLOWING FIBRE REPAIR, THE BREAK POSITION WILL REVERT TO THE FIRST PIC

APPLICATION WITH AN 'ARC'

EXAMPLE WITH AN ARC

FINAL STABLE STATE

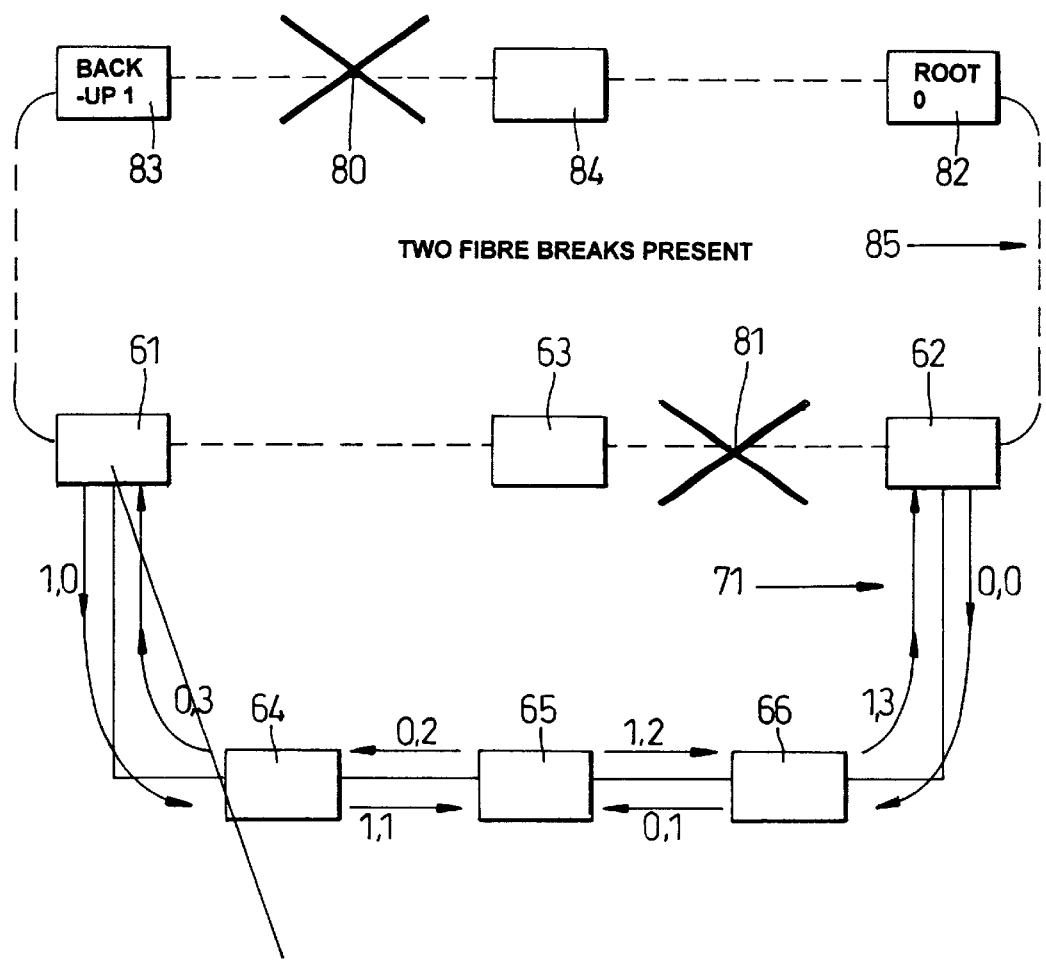

ARC WITH 'SPLIT' MAIN RING

TWO FIBRE BREAKS PRESENT

Under simple rules, this node will not pass into the main ring, the information that it has a route to the Root Node.
The Backup Node will therefore remain active, despite having a route for frames between it and the Root Node.
This is probably acceptable, more sophisticated behaviour could be invented for the Arc access node if desired. eg if Trib has route to Root Node and (after holdoff time), Aggregates do not have route to Root Node, then forward Trib K bytes to aggregates.

*Fig. 8*

APPLICATION WITH INTERCONNECTED RINGS
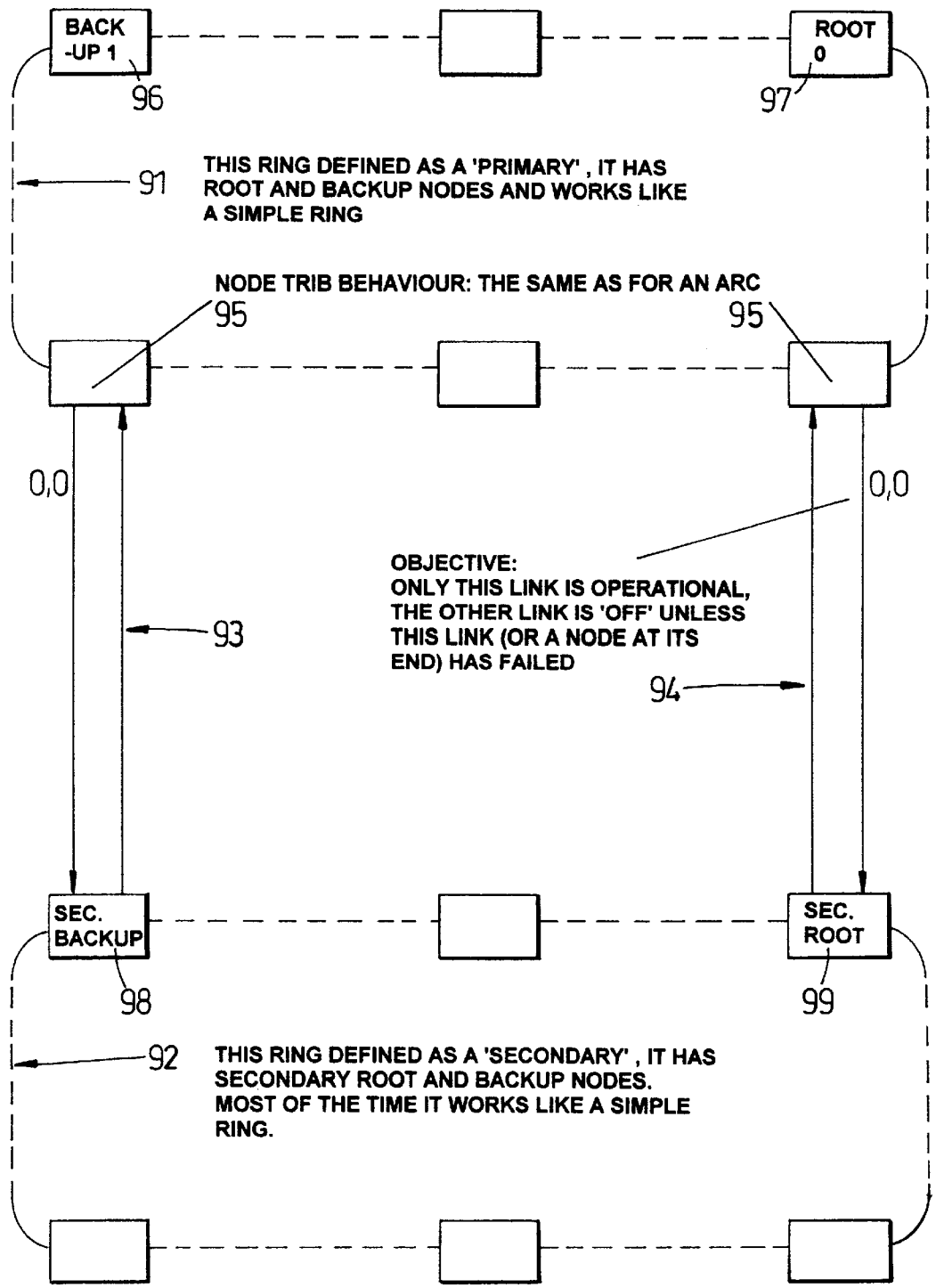
Fig, 9a

APPLICATION WITH INTERCONNECTED RINGS cont...

INTERCONNECTED RINGS: EXAMPLE 1 cont...

INTERCONNECTED RINGS: EXAMPLE 1 cont...

FINAL NOTE ON INTERCONNECTED RINGS

Customers with Mac Addresses added

Next to each port, is shown the Mac address learnt for routing

NOTE: ONCE THE MULTICAST HAS REACHED THE PREVIOUS BREAK, THE ADJACENT NODE LOSES THE KNOWLEDGE OF PREVIOUS BREAK. THE ABOVE PIC BECOMES THE NEW STABLE STATE.

SPANNING TREE ALGORITHM

BACKGROUND OF THE INVENTION

1. Field of the Invention

This invention relates to an improved spanning tree algorithm for use in communications networks. The invention also relates to a communications network incorporating an improved spanning tree algorithm and a computer program for controlling such a communications network.

2. Description of the Prior Art

A local area network (PLAN) is a communications network which typically covers a relatively small geographical area as compared to a wide area network (WAN). For example, a pure ether net is a type of PLAN in which two adjacent network elements may not be separated by more than about 100 m. In a PLAN, such as an ether net, messages are broadcast by a calling party and a called party decides whether to accept these broadcast messages. This differs considerably from a WAN, in which point to point connections are set up rather than broadcasting messages. Also, in a PLAN such as a pure ether net, it is possible for two or more network elements to broadcast messages simultaneously. In this situation a collision occurs and the elements can be arranged to stop broadcasting, wait for an arbitrary time and then restart the broadcast. Alternatively, the network can be made more complex by adding switches which incorporate buffers. By using buffers collisions can be avoided. In contrast, because a WAN uses point to point connections, collisions do not occur. A WAN may be used to connect two or more LANs together over long distances. Typically LANs and WANs use different types of hardware and communications protocols.

As a PLAN becomes more complex it can incorporate bridges which connect together different parts of a PLAN. However, as soon as two or more bridges are incorporated into a PLAN there is a possibility of loops existing in the network. In a PLAN such as an ether net loops are problematic because broadcast messages or packets can end up simply circulating round a loop and never reach their required destination. For a WAN, where point to point connections are used between routers this problem does not exist. The spanning tree algorithm and protocol is an ANSI/IEEE standard method that is used in networks of ether net bridges and switches to prevent infinite packet looping. This spanning tree algorithm and protocol is defined in ANSI/IEEE std 802.1D, 1993 edition. This algorithm works by breaking any loops in the communications network until it becomes a tree structure. In the event of a failure at some point in the communications network it may be possible to restore connectivity by re-running the spanning tree algorithm and making use of a previously redundant route. However, one major problem with the spanning tree algorithm is that it takes as long as twenty seconds or more to take effect. The more complex the network, the longer it will take for the spanning tree algorithm to take effect. Whilst this can be acceptable for simple ether net data networks for more complex networks it presents a problem.

An example of a WAN is a public switched telephone network. In this type of network, use of point to point connections with dial up access is advantageous because these connections are dedicated. However, for other applications such as data communications, traffic is bursty unlike telephone traffic. If dedicated connections are used for data traffic this is wasteful of resources because of the non-continuous nature of the traffic. The dedicated connections tie up resources and do not allow these to be shared. PLAN protocols, such as ether net protocol allow network resources to be shared and so do not have this disadvantage.

Another example of a WAN is a Synchronous Digital Hierarchy network (SDH). This type of network was largely designed for telephony but it can also be used for data communications. Optical fibres are used in the SDH network which provides vastly improved resources and performance (e.g. transmission of 2 mega bits per second) as compared to an ether net. The SDH network typically comprises the "backbone" of a wider communications network and in the case of a protected SDH network the SDH component is formed as at least one ring. This means that if there is a fault in the SDH ring, information can be sent the other way around the ring in order to reach its destination. The ring structure allows full duplication of information by allowing information to be sent both ways around the ring.

In the situation that data switching is incorporated in a wide area telecommunications network it is advantageous to use a local area network protocol such as ether net which allows network resources to be shared. However, this introduces a problem with respect to loops in the network and the possibility of infinite packet looping. If the known spanning tree algorithm is used to prevent infinite packet looping this is problematic, because the spanning tree algorithm takes a relatively long time (e.g. 20 seconds) to complete (as compared to 50 milli seconds for correction to take place in a protected SDH network).

Another problem is that when a fault occurs in the wide area network, then it takes a relatively long time (e.g. 20 seconds) for the spanning tree algorithm to take effect to restore connectivity by removing a break on a previously redundant route.

Entities within a communications network such as an ether net each have an identifying address such as a media access control (MAC) address. Information that is being transferred from A to B within the ether net is forwarded along a path from A to B via intermediate nodes in the network. These intermediate nodes, switches or bridges receive the information and forward it on by making use of a look-up table. Each node has its own look-up table which provides information about which of the nodes outputs to send out the received information on, given information about the destination of the information (e.g. the destination MAC address). Once a spanning tree algorithm has taken effect, it is necessary to update these look-up tables because the configuration of the network has changed. Because this is difficult to effect quickly problems can arise as a result of switches forwarding information along paths that are no longer operational.

It is accordingly an object of the present invention to provide an improved spanning tree algorithm for use in communications networks which overcomes or at least mitigates one or more of the problems noted above.

SUMMARY OF THE INVENTION

According to a first aspect of the present invention there is provided a method of preventing looping of user broadcast messages in a communications network, said communications network comprising a plurality of nodes, each node having two ports, said ports being connected by links to form a ring of nodes, said method comprising the steps of:

(i) sending control signals between nodes in said communications network, each control signal comprising information about which node the control signal originated from and how many nodes have been passed in the ring since that control signal originated;

(ii) blocking one of the ports on a node to user broadcast messages if control signals received by two ports on that node are identical; and (iii) blocking a port to user broadcast messages if identical control signals are simultaneously output from and input to that port; such that in use said ring of nodes is effectively a tree structure for the propagation of user broadcast messages and looping of user broadcast messages around the ring is prevented.

A corresponding computer program stored on a computer readable medium is provided said computer program being for controlling a communications network comprising a plurality of nodes, each node having two ports, said ports being connected by links to form a ring of nodes, said computer program being arranged to control said communications network such that:

(i) control signals are sent between nodes in said communications network, each control signal comprising information about which node the control signal originated from and how many nodes have been passed in the ring since that control signal originated;

(ii) one of the ports on a node is blocked to user broadcast messages if control signals received by two ports on that node are identical; and (iii) a port is blocked to user broadcast messages if identical control signals are simultaneously output from and input to that port; such that in use said ring of nodes is effectively a tree structure for the propagation of user broadcast messages and looping of user broadcast messages around the ring is prevented.

A corresponding communications network is provided, said communications network comprising a plurality of nodes, each node having two ports, said ports being connected by links to form a ring of nodes, wherein:

(i) said nodes are arranged to send control signals via said links, each control signal comprising information about which node the control signal originated from and how many nodes have been passed in the ring since that control signal originated;

(ii) said ports are arranged to be blocked to user broadcast messages if control signals received by two ports on a node are identical; and (iii) said ports are also arranged to be blocked to user broadcast messages if identical control signals are simultaneously output from and input to a port; such that in use said ring of nodes is effectively a tree structure for the propagation of user broadcast messages and looping of user broadcast messages around the ring is prevented.

This provides the advantage that a ring or loop of nodes in a communications network effectively becomes a tree structure from the point of view of the propagation of user broadcast messages in the communications network. This prevents looping of the user broadcast messages around the ring. The method of achieving this is greatly simplified as compared to the known spanning tree algorithm and thus takes effect more quickly.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 8 shows an SDH arc that is connected to an SDH ring where two fibre breaks are present in the SDH ring.

FIGS. 9a and 9b illustrate an example of two interconnected SDH rings and indicate how the improved spanning tree algorithm works in this case.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

The term "node" is used to refer to any entity in a communications network which is able to receive information from other entities in the communications network and which is able to output information into the communications network. For example, an SDH bridge, switch or router. Other examples include an Internet Protocol (IP) router or other routers.

The term "link" is used to refer to any connection between two nodes in a communications network. The link may be a physical structure such as an optical fibre cable or a radio communications connection. Other examples of links include co-axial cables or twisted pair cables.

Figure 2:
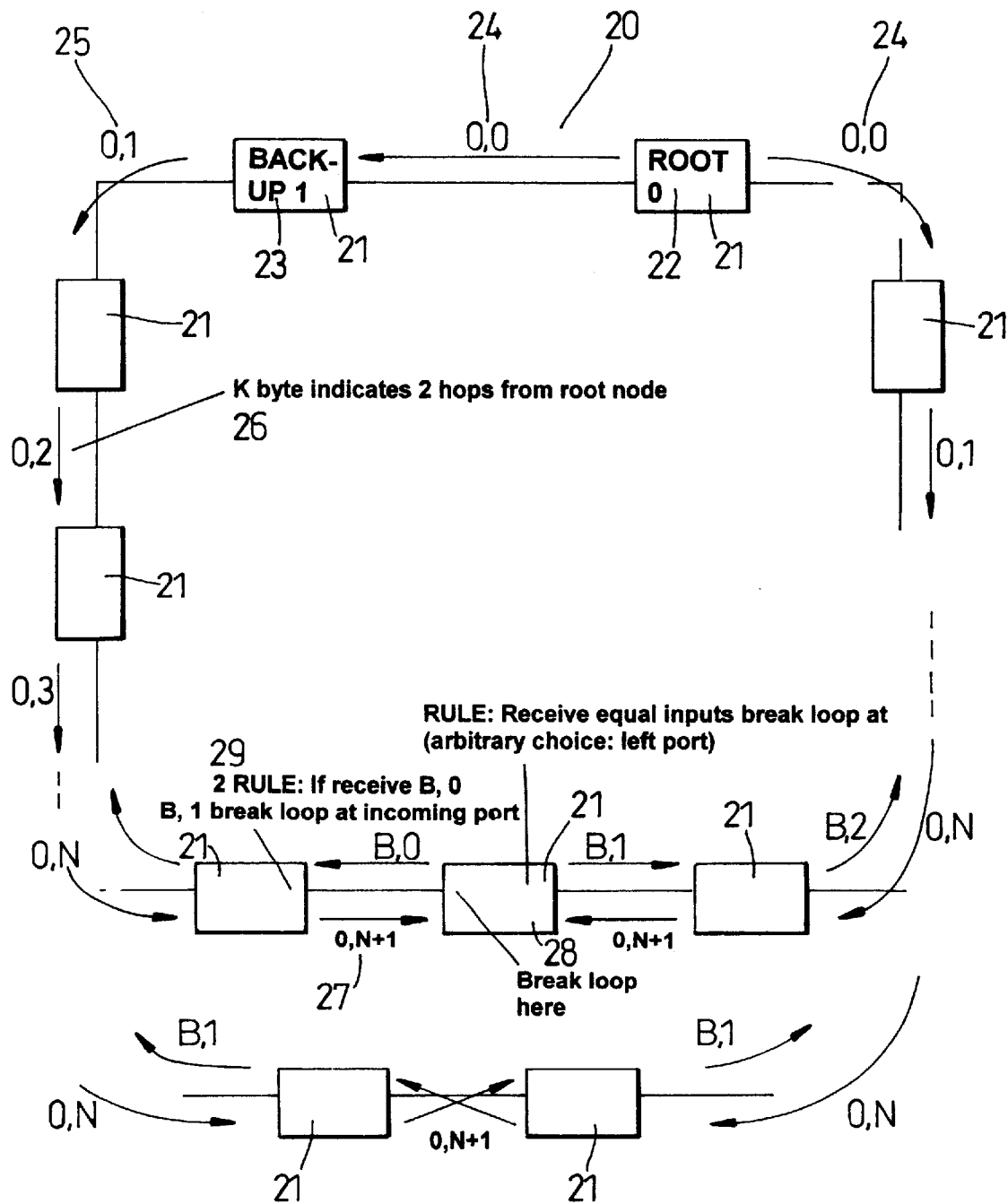
FIG. 2 is a general schematic diagram indicating how the improved spanning tree algorithm works for an SDH ring with an even number of nodes and also an odd number of nodes.

FIG. 2 shows an example of an SDH ring 20 comprising a number of nodes 21 which are connected together to form the ring 20 as shown. Each node 21 is capable of forwarding information in either direction around the SDH ring 20 and contains a frame switch in order to do this. Intermediate SDH nodes may be present in the ring 20 but are not shown in FIG. 2. Each node has at least two ports which can be used to connect to other ports on the adjacent nodes in order to form the ring 20.

It is not essential to use an SDH ring. Other types of communications network can be used such as plesiochronous digital heirarchy (PDH) or asynchronous digital heirarchy communications networks.

One of the nodes 21 is selected to be a root node 22. For example, all the nodes 21 may be assigned a priority value by the operator and the highest priority node chosen as the root node 22. Another one of the nodes 21 is then chosen to be a back-up-node 23.

The improved spanning tree algorithm is implemented by control signals which are sent over the SDH ring continuously. When a network break is created by the spanning tree algorithm in order to remove a loop in the network then user data traffic is prevented from flowing through this break but the control signals are not. The control signals can comprise two digits, one which represents the node which created the control signal and one which represents the number of nodes that the control signal has passed through since it was created. The latter digit will be referred to as the "hop signal" and the former digit will be referred to as the "node signal". For example, in an SDH network, the control signals are sent using KBYTES K3 or K4. In this case it may be necessary to use the whole byte or run over two frames.

KBYTES K3 and K4 are part of the SDH overhead and are normally used in an SDH network to carry data which is concerned with path protection. However, in the present invention SDH path protection is not required and instead the KBYTES normally used to carry path protection information are used to carry the control signals which put the improved spanning tree algorithm into effect. This provides the advantage that the spanning tree algorithm takes effect efficiently in a very short time.

KBYTES K3 and K4 are both nibbles each of which can be used to carry information about one of the control signals "hop signal" or "node signal". However, another option is to use only one of the K3 and K4 nibbles to carry information about control signals and use only one of the K3 and K4 nibbles from a second frame in which to carry information about the other control signal. By doing this a combination of path protection and the improved spanning tree method can be implemented. That is, one of the K3 and K4 nibbles can be used for path protection at layer 1 in the communications network whilst the other K3 or K4 nibble can be used for the improved spanning tree algorithm.

The improved spanning tree algorithm comprises a number of rules that are implemented by processors within the network nodes. These rules are listed below:

Rule 1
For all nodes except the root node, if the node has only two ports and the control signal inputs on both ports are identical then the ring should be broken at either one of the node's ports.

Rule 2
If the node receives the control signal input B,0 or loss of signal, then the port at which this control signal was received should be broken.

Rule 3
If, from a single port the same control signal is sent and received simultaneously then that port should be broken.

Rule 4
The root node should always launch control signals unless it is broken

Rule 5
The back up root node should only launch control signals if it receives none from the root node on either port Rule 6
If a node other than the root node receives a control signal it should increment the hops signal and forward the whole control signal to the next node.

Rule 7
If a node has a broken port it should create and output the control signal B,0 from the broken port and B,1 from any port on the node which is not broken.

In the example shown in the top part of FIG. 2 the ring 20 has an even number of nodes 21. Following rule 4 the root node 22 sends out control signals 24 in both directions. The control signals 24 in this case are both 0,0. These figures indicate the number of the node from which the signal originated and the number of hops that have been made from that originating node. The root node 22 is represented by the number zero in the example shown in FIG. 2. The control signals 0,0 indicate that the signal emanated from the root node 22 and that zero hops have been made from the root node 22. Following rule 6, the back up node 23 then outputs a control signal 25 with the value, 0,1. This control signal 25 indicates that the signal originated from the root node 22 and that one hop has been made from the root node. The next node 21 in the ring then receives input signal 0,1 and outputs signal 0,2 to indicate that two hops have been made from the root node 26. This process of signalling continues until node N+1 is reached and this node outputs a control signal with the value 0,N+1 as shown at 27 in figure 2. In the meantime control signals have been passing from the root node 22 around the SDH ring 20 in the opposite direction. In this example node N+2, shown as 28 in FIG. 2, receives identical inputs from each node directly connected to it in the ring 20. This fulfils the condition for rule 1 and so the processor in node N+2 breaks the ring at one of its ports. In the example shown in FIG. 2 the left port is broken although this is an arbitrary choice; the right port could have been broken instead. Once the left port of node N+2 is broken, this node sends out control signal B,0 from its broken port and control signal B,1 from its non-broken port following rule 7. Because the non-broken port is one node from the break which is on the other port of the node it sends out control signal B,1. Node N+1 then receives control signal B,0 at its port 29. This fulfils the condition for rule 2 and therefore port 29 is broken. That is port 29 becomes blocked to user data but not to control signals. The result is that the connection between node N+1 and node N+2 is blocked to user data; the ring 20 is broken at this point and data is prevented from looping infinitely around ring 20. None of the conditions for rules 1, 2 or 3 are fulfilled elsewhere in the ring 20 and so no further breaks occur.

The bottom part of FIG. 2 shows the situation where the number of nodes in the network is odd. The nodes and links shown separately below ring 20 are intended to be substituted for the bottom part of ring 20 in the top part of FIG. 2. In this case the two nodes furthest from the root node are illustrated and each have a port which sends and receives an identical control message. This fills the condition for rule 3 and the ring is broken at this point. Again, none of the conditions for rules 1, 2, or 3 are fulfilled elsewhere in the ring 20 and so no further breaks occur.

Figure 1:
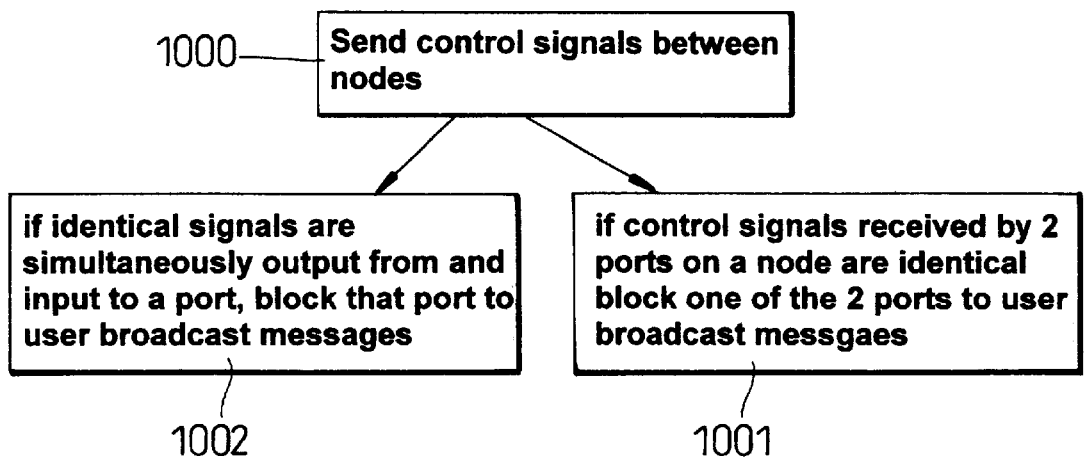
FIG. 1 is a flow diagram for an example of a computer program which implements an improved spanning tree algorithm.

The examples shown in FIGS. 1 and 2 illustrate how, by assuming that the communications network is in the form of a ring, that the spanning tree algorithm is simplified and arranged to take effect quickly. The improved spanning tree algorithm is also able to deal with other communications network structures such as those built up from several rings and others as discussed later.

Figure 3A:
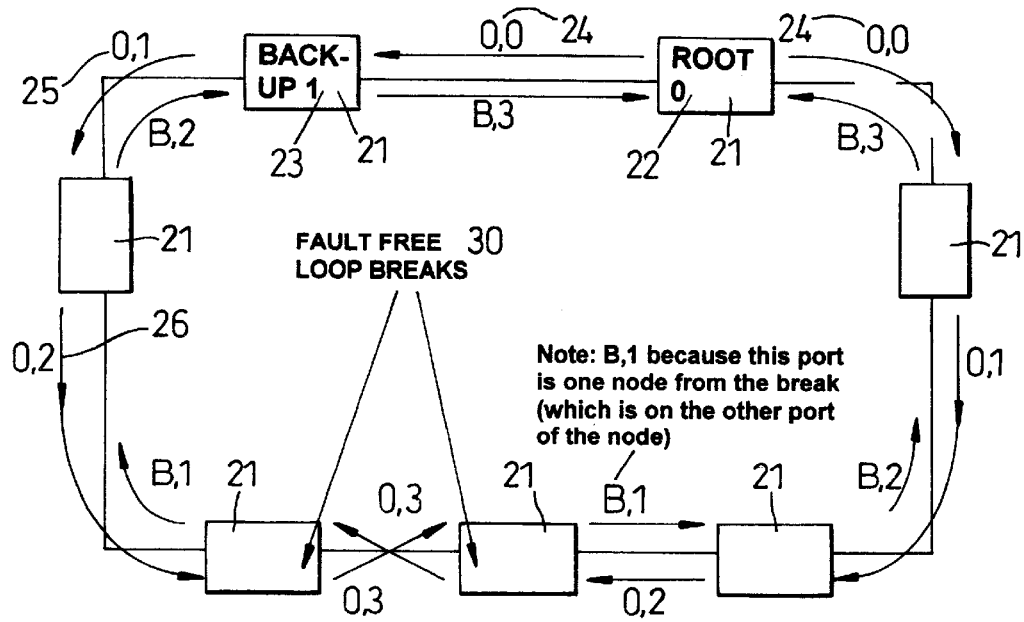
FIGS. 3a to 3d indicate how the improved spanning tree algorithm deals with an uni-directional fibre failure in an SDH ring.
Figure 3B:
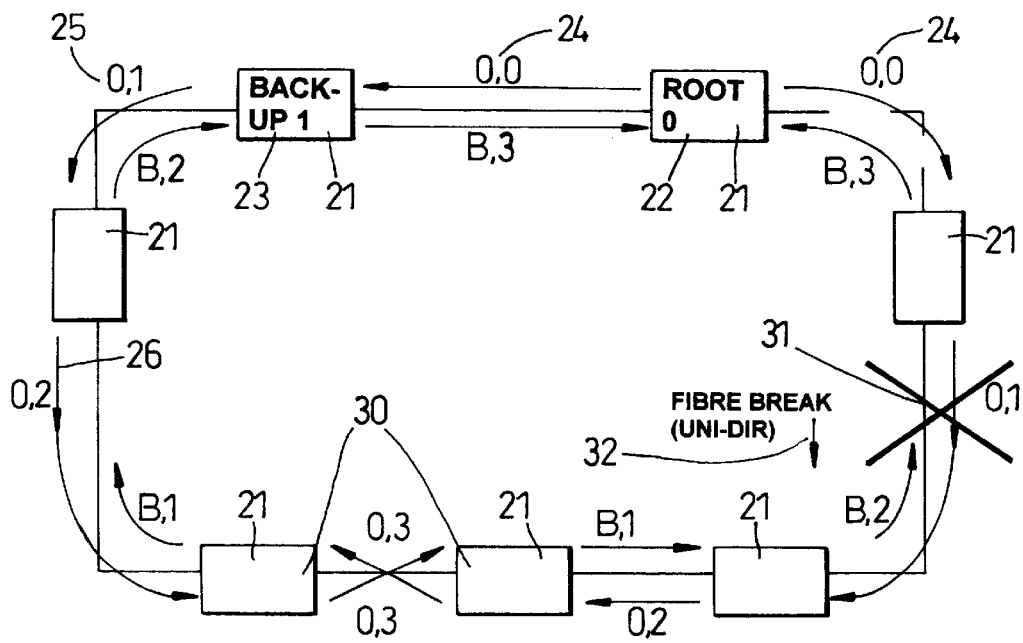
Figures 3C, 3D:
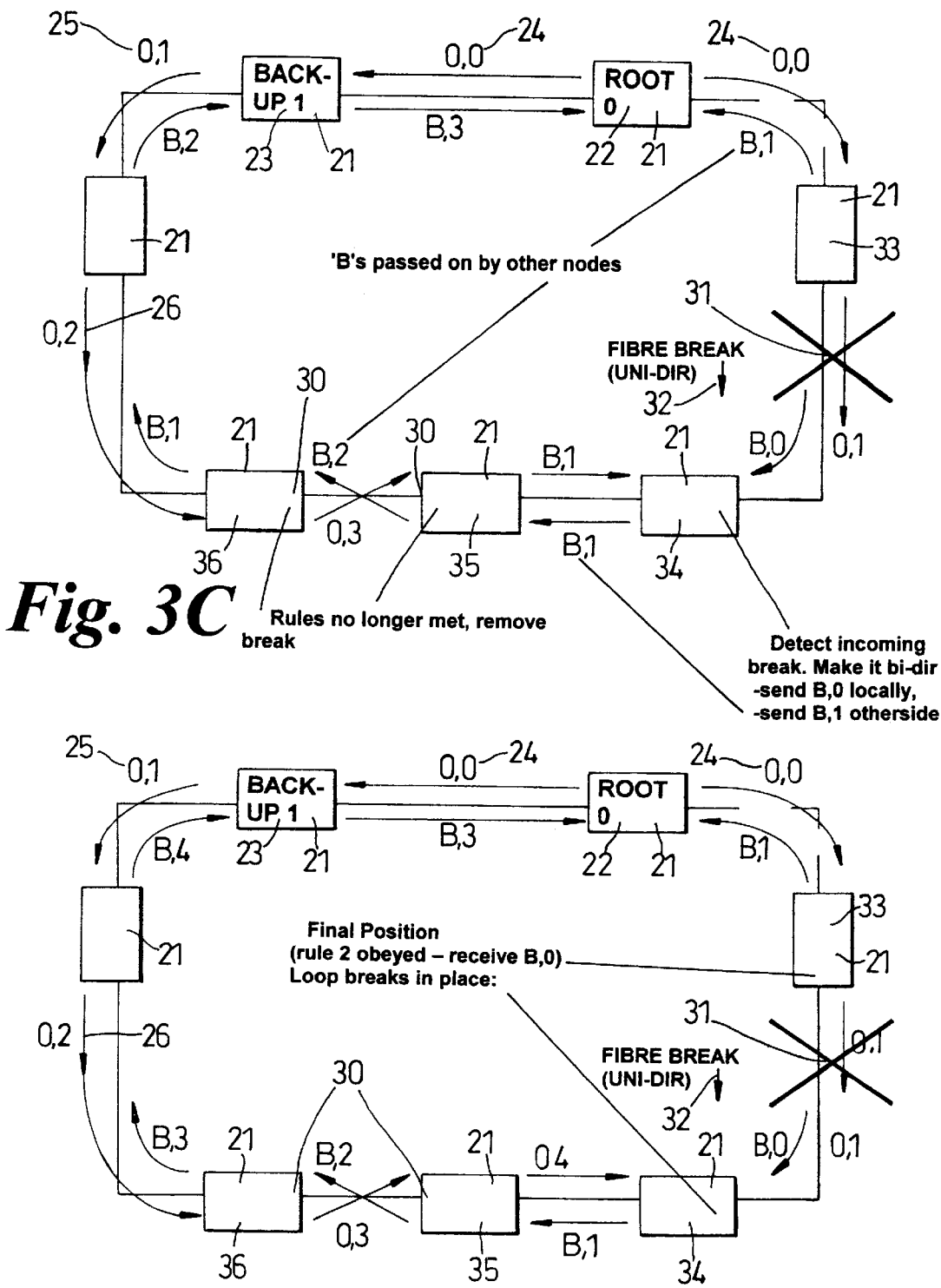

FIGS. 3a to 3d indicate how the improved spanning tree algorithm deals with a fibre failure in an SDH ring. FIG. 3a illustrates the situation for an SDH ring with an odd number of nodes where the improved spanning tree algorithm has effected breaks at ports 30. (This is the same situation as for the bottom part of FIG. 2) That is, ports 30 are arranged to block user data but to allow the passage of control signals. FIG. 3b is the same as FIG. 3a except that a real break in the SDH ring is shown at 31. This is a uni-directional break which means that at the break region 31 information can flow in the direction of arrow 32 but not in the opposite direction. Following rule 7, node 33 outputs control signal B,1 from its output port on the opposite side to the break and outputs control signal B,0 on its output port on the same side as the break (this is possible because the break 31 is uni-direcitonal). Node 34 receives control signal B,0 as input and outputs control signal B,1 following rule 6. Because the break 31 is uni-directional control signal 0,1 is still able to reach node 34 from node 33. Following rule 7, node 34 receives control signal B,0 and breaks the port that receives this control signal. This makes the fault 31 bi-directional. In the meantime, node 35 receives control signal B,1 and outputs control signal B,2. This means that ports 30 no longer send and receive the same control signal and so the breaks at ports 30 (which were created by the improved spanning tree algorithm) are removed. Once the breaks at ports 30 are removed node 35 outputs control signal 0,4 instead of B,1 and node 36 outputs control signal B,3 instead of control signal B,1 as shown in FIG. 3D. Once the network operator has repaired the fibre failure at 31 then the break position reverts to ports 30 as shown in FIG. 3A.

The example described in FIGS. 3a to 3d illustrates how the improved spanning tree algorithm is able to ensure survival of communications network connectivity in the event of a single network fault.

Figure 4A:
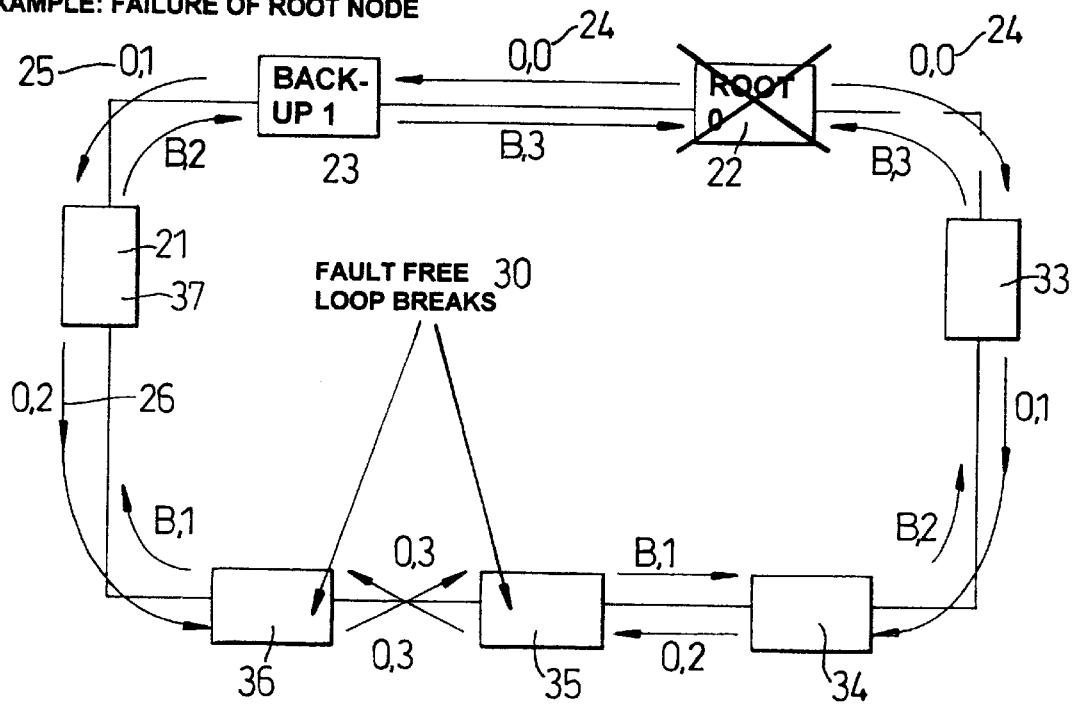
FIGS. 4a to 4c indicate how the improved spanning tree algorithm deals with failure of a root node in an SDH ring.
Figure 4B:
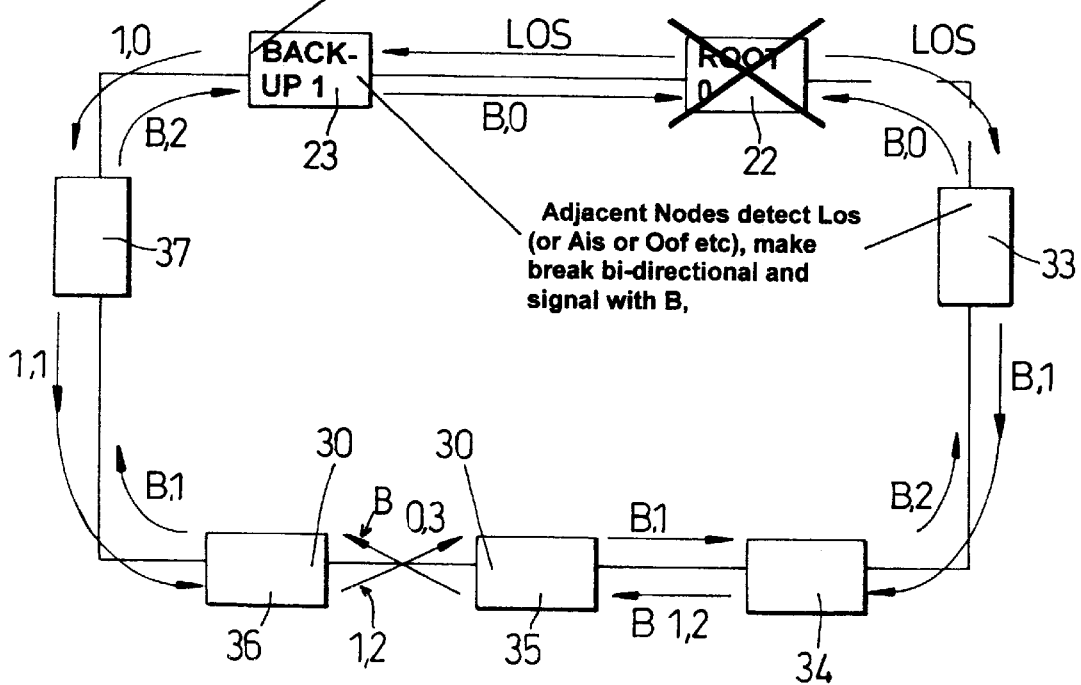
Figure 4C:
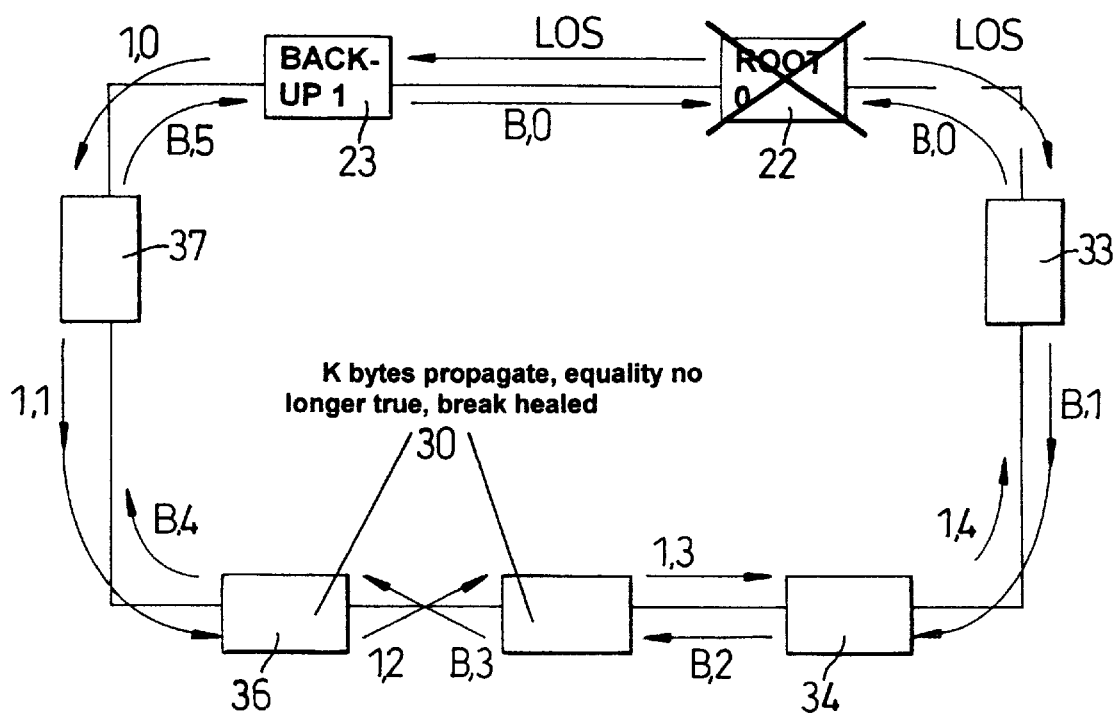

FIGS. 4a to 4c illustrate the situation when the root node 22 fails. FIG. 4a is the same as FIG. 3a except that the root node 22 has failed. Before the root node 22 failed the SDH ring 20 was broken at ports 30 by the improved spanning tree algorithm. Because the root node is broken it does not launch any control signals. Instead of control signals 24 being launched by the root node 22 as shown in FIG. 4a, there is a loss of signal (LOS) from the root node 22 as illustrated in FIG. 4b. The nodes adjacent in the SDH ring 20 to the root node 22 detect this loss of signal from the root node 22 and as a result they break their ports which receive this loss of signal (following rule 2). Node 33 follows rule 7 and outputs B,1 from its port opposite to the break at the node 22. Node 34 receives control signal B,1 and outputs B,2 and similarly node 35 receives control signal B,2 and outputs control signal B,3. This means that ports 30 no longer send and receive the same control signals and so the condition for rule 3 is not met and the break at ports 30 is removed.

Meanwhile, because root node 22 is broken and does not launch any control signals, then the back up node 23 does not receive and control signals from the root node 22. This fulfils the condition for rule 4 and so the backup node 23 launches its own control signal on its non-broken port. This means that control signal 25 from back up node 23 changes from 0,1 in FIG. 4a to 1,0 in FIG. 4B. The control signal 1,0 in this case indicates that the control signal was launched by node 1 (i.e. 1 node away from the root 22) and that zero nodes have passed on the control signal so far. Node 37 receives this control signal and outputs control signal 1,1 following rule 6. This results in the situation shown in FIG. 4c.

FIGS. 5a to 5f show an example of a bi-directional fibre break between the root node 22 and the backup node 23.

Figure 5A:
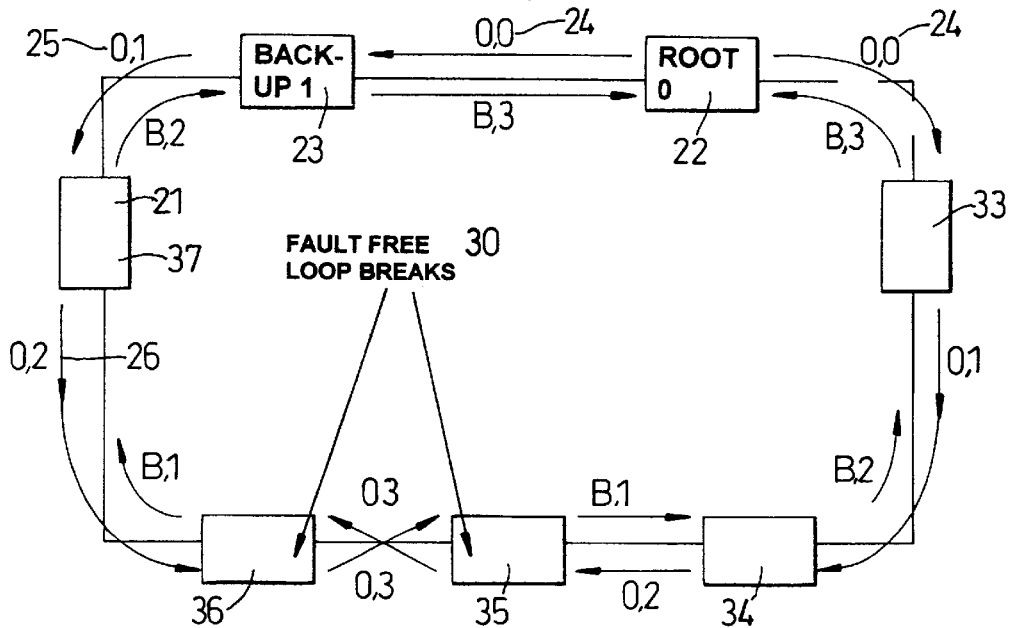
FIGS. 5a to 5f indicate how the improved spanning tree algorithm deals with a bi-directional fibre failure between a root node and a backup node in an SDH ring.
Figure 5B:
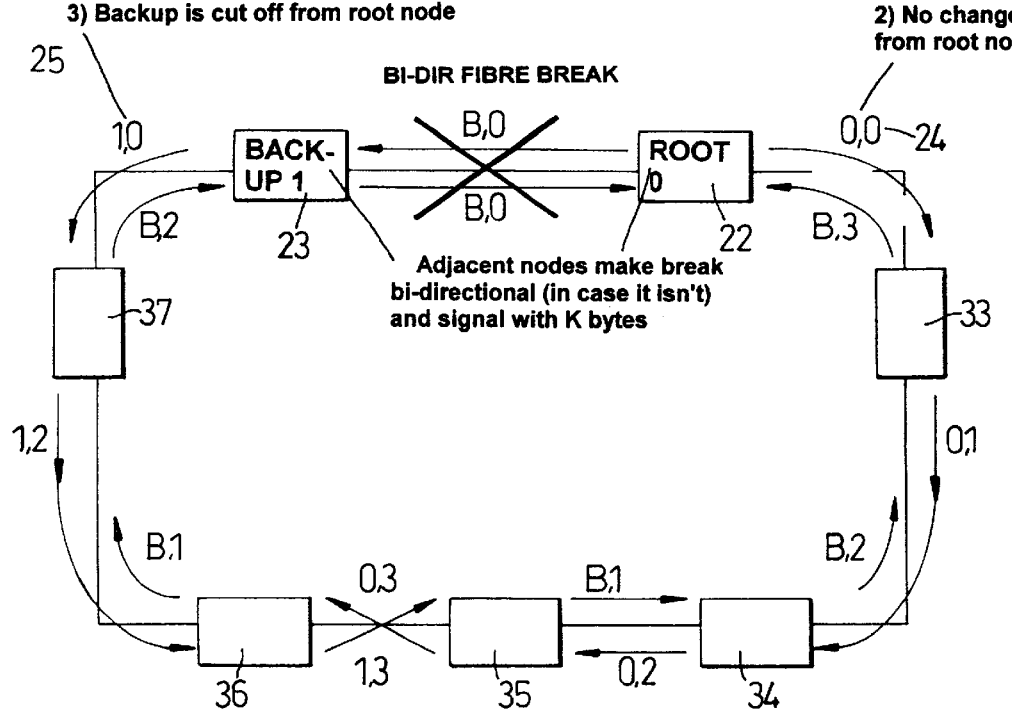
Figure 5C:
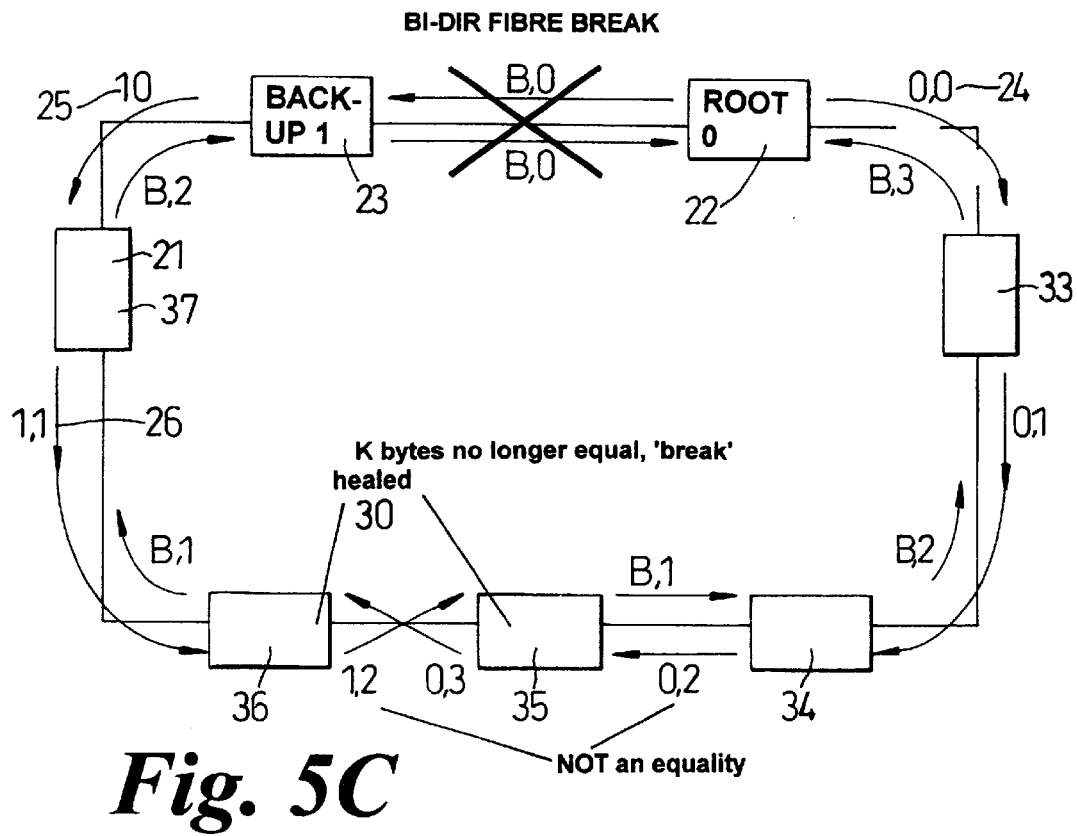
Figure 5D:
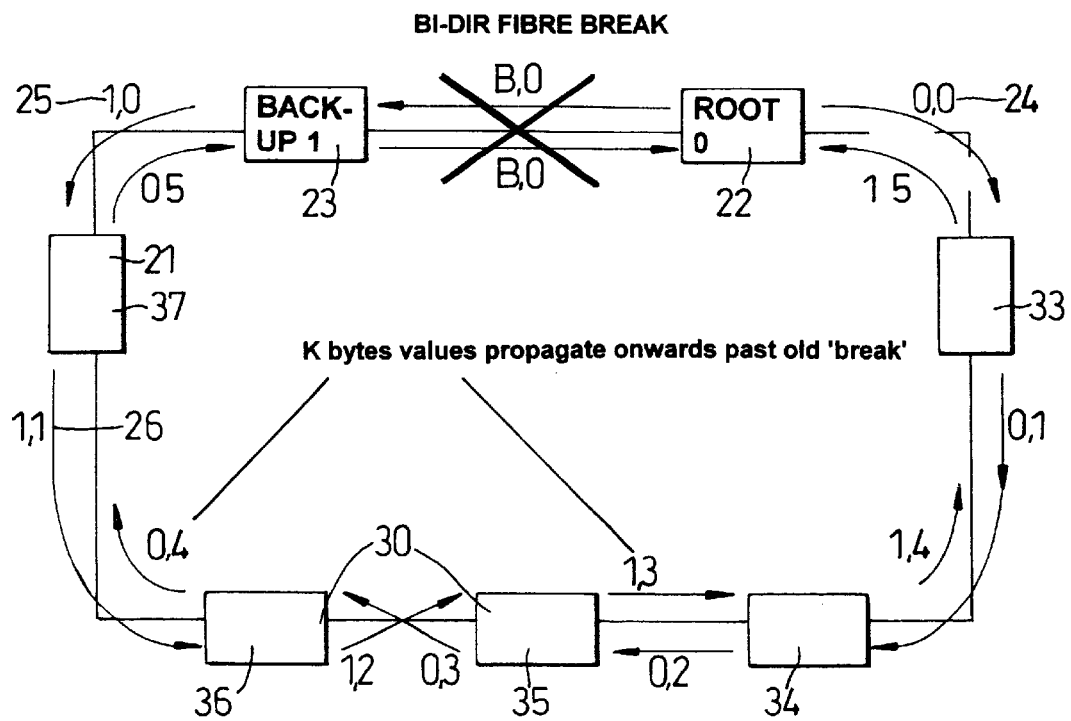
Figure 5E:
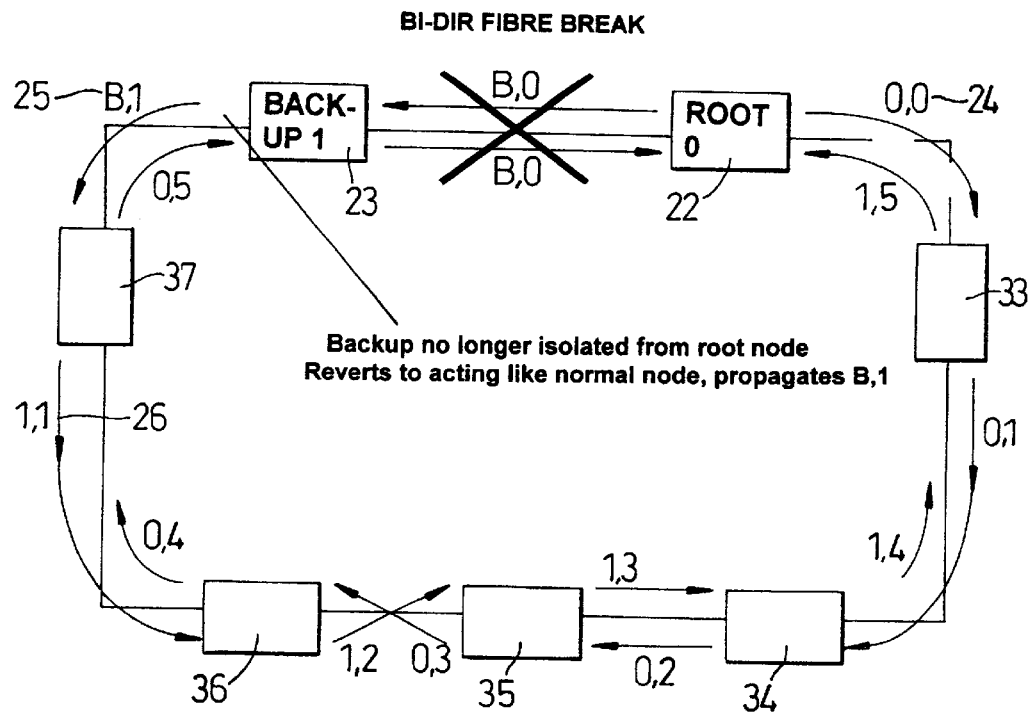
Figure 5F:
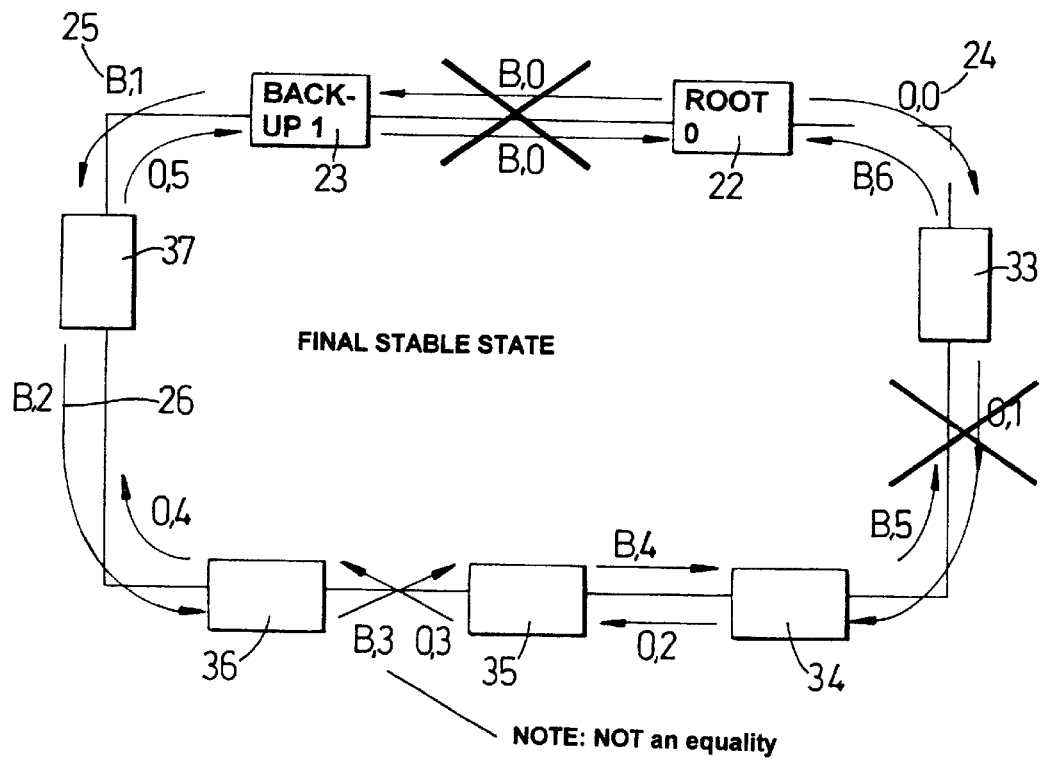

FIG. 5a is the same as FIG. 3a and shows the situation where the SDH ring 20 is broken at ports 30 by the improved spanning tree algorithm. FIG. 5b shows the same situation except that a bi-directional fibre break occurs between the root node 22 and the backup node 23. Because the backup node 23 is cut off from the root node 22 it follows rule five and launches its own control signal 1,0 as shown at 25 in FIG. 5b. Node 37 receives this control signal 1,0 and following rule 6 this signal is propagated around the ring so that ports 30 no longer send and receive the same control signals and rule 3 is not met. This means that the break at ports 30 is removed (as shown in FIG. 5c). Meanwhile the root node launches control signal 24 to node 33 and this signal propagates around the ring. Once the break at ports 30 is healed however, the node 36 has no broken ports and so it continues to propagate the signal from the root node 22 instead of issuing a break signal B,1. This means the control signals from the root node 22 do eventually reach the back up node 23 and the condition of rule 5 is no longer met. This is illustrated in FIG. 5d. The back up node then reverts to its normal mode and propagates control signal B,1 following rule 7. This is shown in FIG. 5e. However, when the control signal B,1 from the back up node propagates round to ports 30, the ports 30 do not send and receive the same signal and so no break is created at these ports. This results in a final stable state as shown in FIG. 5f.

Figure 6:
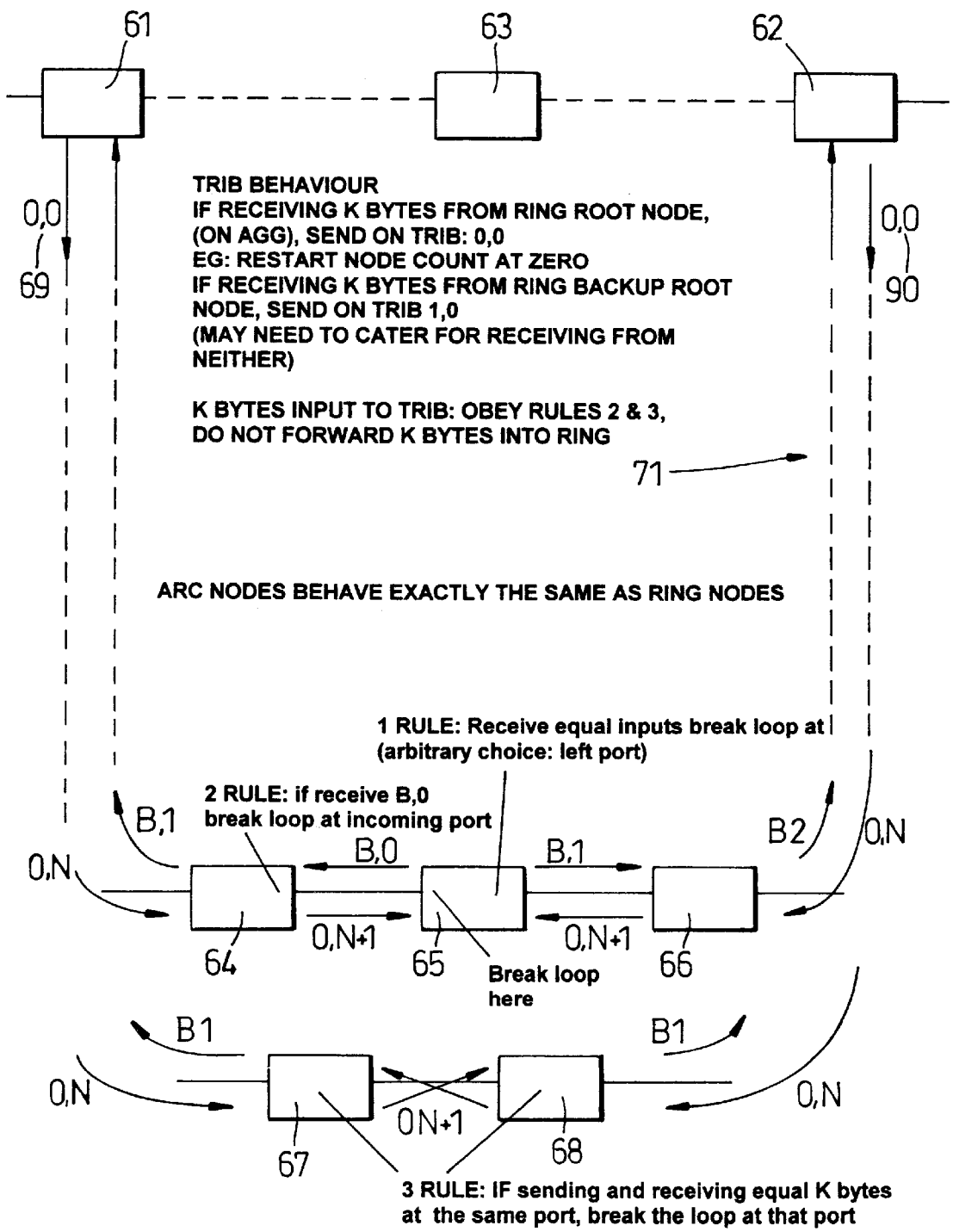
FIG. 6 indicates how the improved spanning tree algorithm works for an SDH arc that is connected to an SDH ring.

FIG. 6 shows an arc 71 that is connected to an SDH ring (not shown) via arc access nodes 61 and 62. Nodes 61, 62 and 63 are part of the SDH ring in which the improved spanning tree algorithm is implemented. The SDH ring therefore includes a root node and a backup node, control signals are launched and the rules described above for implementing the improved spanning tree algorithm are followed. Infinite packet looping could occur around the arc 71 and this is prevented using the improved spanning tree algorithm. In order to do this the arc access nodes 61 and 62 are arranged such that if they receive a control signal from the root node they send this control signal on to the arc after restarting the node count to zero. For example, if the control signal 0,14 is received by the arc access node 61 it forwards the control signal 0,0 to the first node in the arc. If an arc access node receives a control signal from the backup node (e.g. 1,14) then it forwards control signal 1,0 to the first node in the arc. Effectively this involves provision of a further rule:

Rule 8

If an arc access node receives a control signal from a root node or backup node then the node count part of the control signal is set to zero and the control signal is forwarded to the first node in the arc.

Arc access nodes are arranged so that they do not send control messages from within the arc into the main SDH ring.

An additional rule or rules can be provided for the situation in which an arc access node receives no control signals from a backup node or a root node.

The arc nodes follow the same rules as do the ring nodes discussed previously; that is rules 1 to 7 listed above. The top part of FIG. 6 shows the situation where the arc contains an odd number of nodes. Arc access nodes 61 and 62 send out control signals 0,0 as shown at 69 and 70. These control signals are passed on from node to node in the arc and the node number (of hops number) part of the control signal incremented following rule 6. Eventually, node 65 receives the name control signal at each of its two ports and following rule 1 it breaks either of these two ports. In the example in FIG. 6 the left port is broken. Following rule 7 the control signal B,0 is launched from the broken port on node 65. Node 64 receives this signal and following rule 2 breaks the port that received this signal. The result is that user data signals cannot pass directly between nodes 64 and 65 but control signals are able to do this. This ensures that infinite packet looping of user data around the arc doe not occur. The bottom part of FIG. 6 illustrates the situation when there is an even number of nodes in the arc. In this case node 68 sends and receives control signal 0,N+1 on one of its ports and following rule 3 this port is broken. Similarly, node 67 sends and receives control signal 0,N+1 on one of its ports and this port therefore becomes broken. This effectively breaks the arc between nodes 67 and 68 and prevents infinite packet looping of user data around the arc.

Figure 7A:
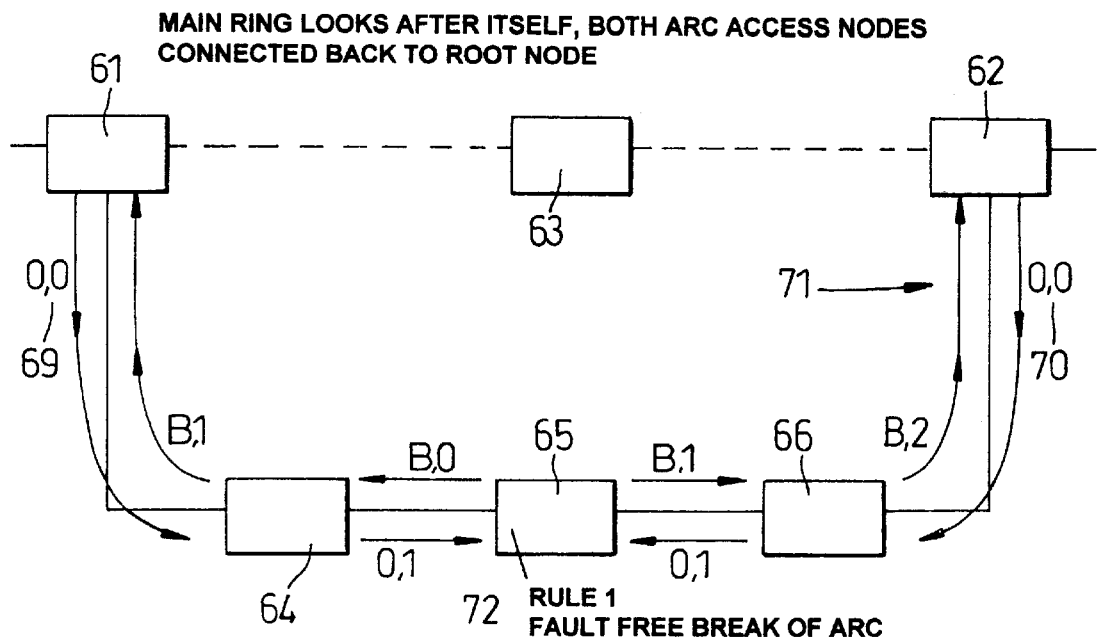
FIGS. 7a to 7d indicate how the improved spanning tree algorithm deals with a uni-directional fibre break in an SDH arc that is connected to an SDH ring.
Figure 7B:
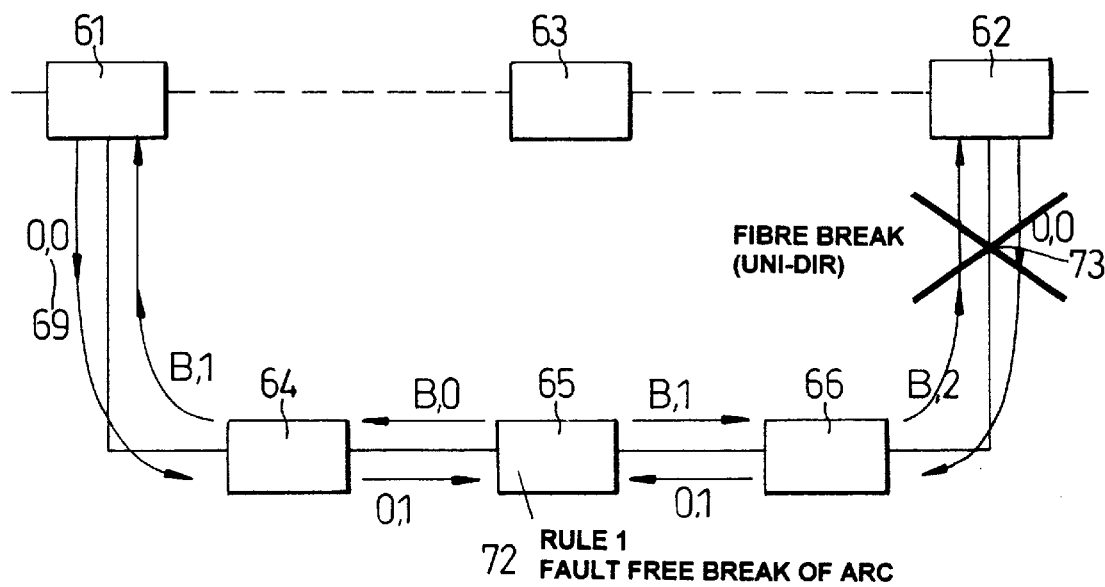

FIGS. 7a to 7d illustrate the situation when a uni-directional fibre break occurs in an SDH arc 71. Where the same reference numerals are used as for FIG. 6 these are intended to indicate the same features. FIG. 7a shows how arc access nodes 61 and 62 send controls signals 69 and 70 into the arc 71 as in FIG. 6 and the arc 71 which has an odd number of nodes becomes broken at 72 as a result of the improved spanning tree algorithm. This is the same situation as shown in the top part of FIG. 6. The main SDH ring (not shown) effectively "looks after itself" using the improved spanning tree algorithm rules listed above and the arc access nodes 61 and 62 are connected back to a root node in the main SDH ring. A uni-directional fibre break then occurs in the arc as shown at 73 in FIG. 7b. At this stage the arc is broken at two points 73 and 72 and this is not satisfactory because user data cannot reach nodes between these two breaks.

Figure 7C:
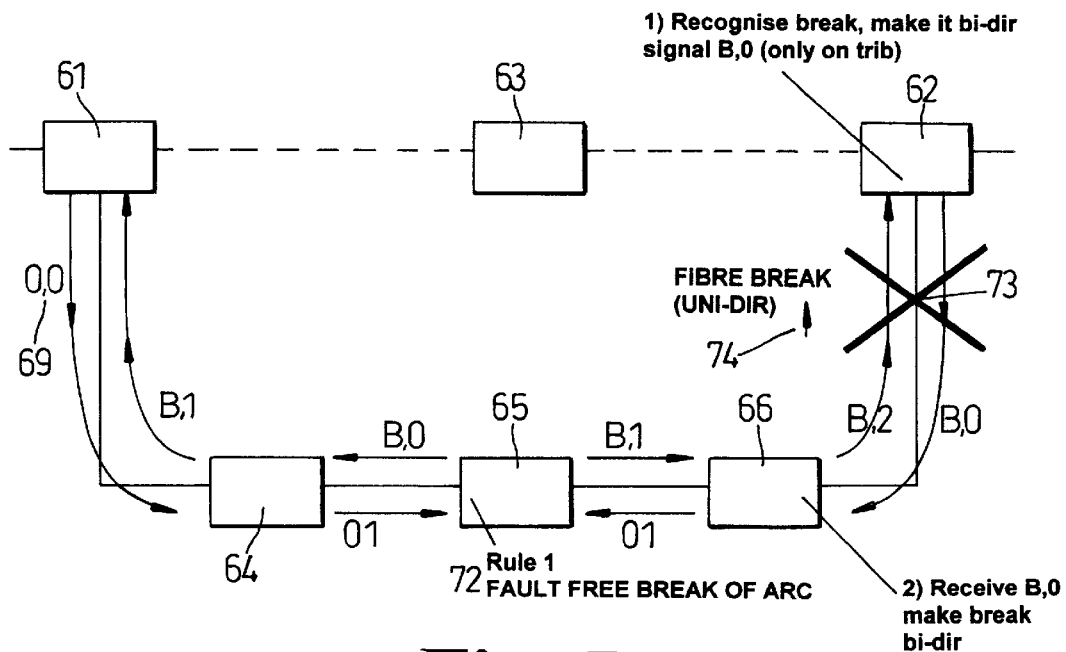

Arrow 74 in FIG. 7c shows the direction of the uni-directional fibre break 73. That is, there is a communications break in the direction of the arrow 74 but not in the opposite direction. Node 66 receives control signal B,0 or loss of signal from the fibre break region 73 and following rule 2 node 66 breaks its port that received the B,0 signal. This makes the break at 73 effectively bi-directional.

Figure 7D:
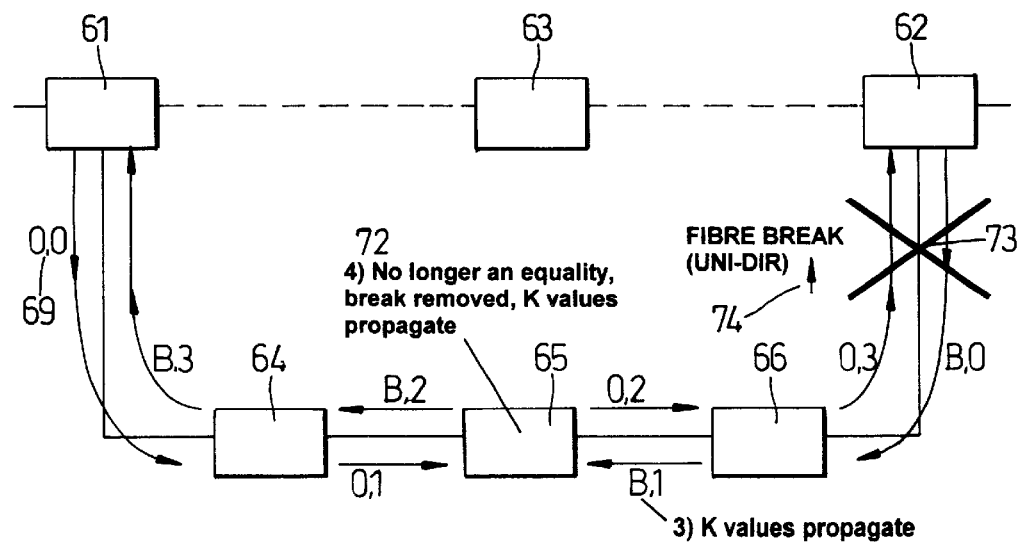

Control signal B,0 is received by node 66 and passed onto node 65 as B,1 following rule 6. This means that node 65 no longer receives identical inputs on both its ports and the condition for rule 1 is not met. The break at 72 is therefore removed (this break was created by the improved spanning tree algorithm) as shown in FIG. 7d.

FIG. 8 shows an example of an SDH ring 85 to which an SDH arc 71 is connected. The reference numerals for the arc 71 correspond to those for the arc illustrated in FIGS. 6 and 7. In this example, two fibre breaks 80 and 81 are present in the main SDH ring 85. Following rule 5 the backup node 83 launches its own control signals because it does not receive any control signals that it can identify as being from the root node 82. Any control signals that are output from the root node 82 cannot reach the back up node 83 via the main ring alone because of fibre breaks 80 and 81. Any control signals that are output from the root node cannot reach the backup node via the arc because arc access node 61 does not pass control signals from the arc into the main ring 85.

Following rule 8, arc access node 61 receives control signals from the back up node 83 and forwards these to the first node 64 in the arc after setting the control signal for the number of nodes to zero. Node 61 therefore forwards control signal 1,0 to node 64. Node 64 increments this control signal and forwards it (i.e. 1,1) to node 65. Similarly, node 65 forwards control signal 1,2 to node 66 and node 66 forwards 1,3 to node 62. Node 62 is then aware that there is an unbroken path along the arc. Node 62 receives input control signals from the root node 82, resets the node number to zero and forwards this control signal to node 66. This signal propagates through the arc to node 61 which is then aware that there is an unbroken path along the arc.

Because the arc access nodes 61 and 62 do not forward control signals from within the arc to the main ring 85 then the backup node 83 does not become aware that there is an unbroken path from the backup node 83 to the root node 82 via the arc 71. In fact the condition for rule 5 is not met but the back up node is not aware of this. However, this is acceptable because there are no loops in combined ring and arc structure and user messages are able to reach all the nodes.

If required, more sophisticated behaviour can be implemented by creating another rule. For example, if the arc has access to the root node and (after a time delay) not all nodes in the main ring have access to the root node then the arc access nodes can be configured to forward control signals from the arc into the main ring 85.

Figure 9B:
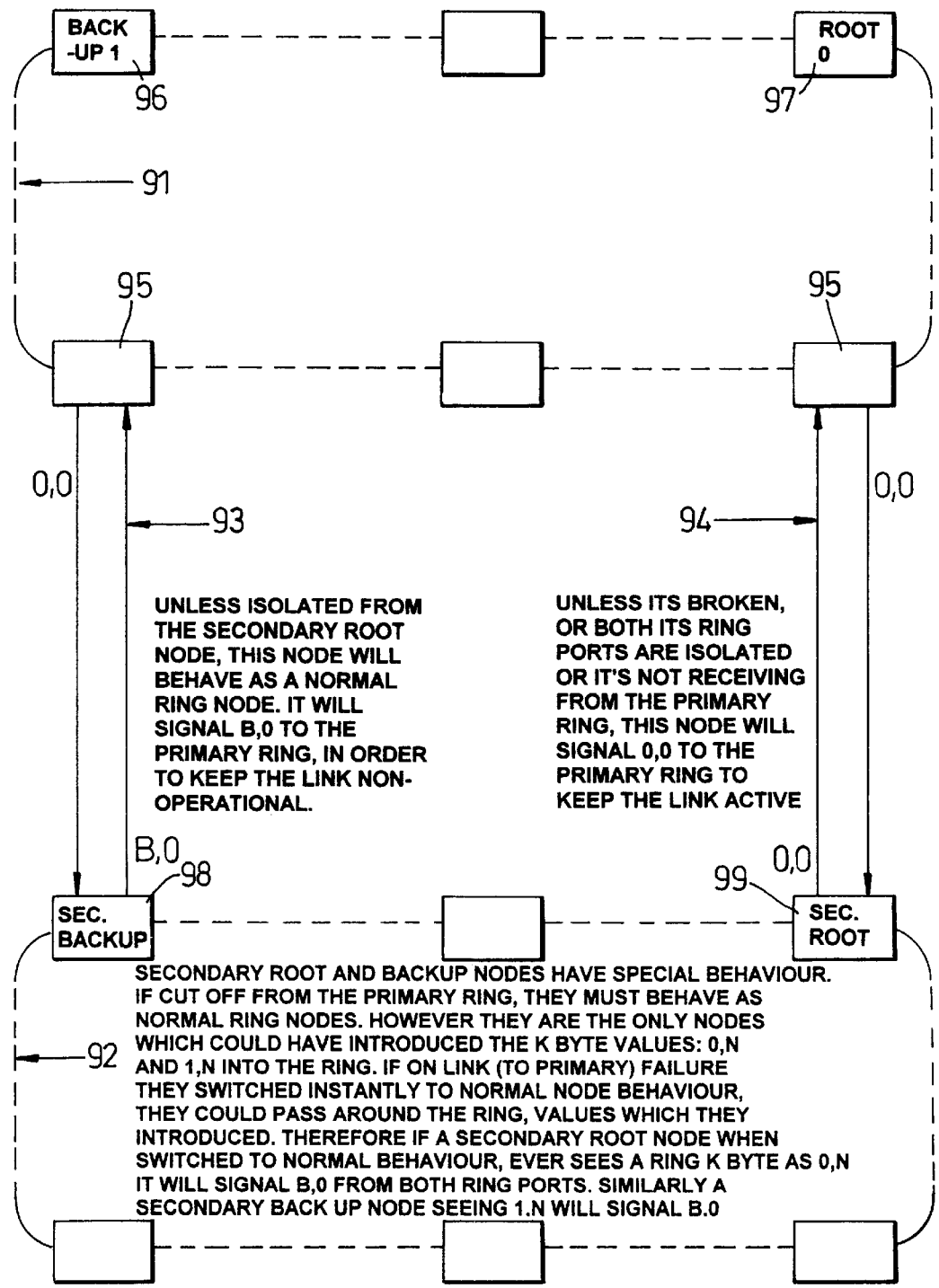

FIGS. 9a and 9b show examples of two interconnected SDH rings and indicate how the improved spanning tree algorithm works in this situation. One of the rings 91 is defined as a primary ring with a primary root node 97 and a primary backup node 96. This ring 91 has two access nodes 95 which are each connected to a secondary ring 92. One of the access nodes 95 connects to a secondary root node 99 in the secondary ring 92 and the other access node 95 connects to a secondary backup node 98 in the secondary ring 92. Each connection 93, 94 between an access node 95 and the secondary root node 99 or secondary backup node 98 is bi-directional.

The primary ring 91 is arranged so that the improved spanning tree algorithm takes effect in that ring just as if it were a simple independent ring. The access nodes 95 are arranged to follow the same rules as for access nodes in an arc. The secondary ring 92 also operates like an independent ring most of the time.

Because there are two connections 93, 94 between the two rings 91, 92 then even when the improved spanning tree algorithm has split each of the rings 91, 92 into two branches then infinite packet looping can still occur. In order to prevent infinite packet looping it is necessary to ensure that only one of the connections 91, 92 is operational at any one time.

Because the arc access nodes 95 act as access nodes in an arc they forward control signals that they have received from the root 97 or backup node 96 after first having reset the node number part of the control signal to zero. In the example shown in FIGS. 9a and 9b the arc access nodes 95 both forward control signal 0,0 to the secondary ring 92.

The secondary root node 99 is arranged so that when it receives the signal 0,0 from the primary ring 91 via connection 94 it returns this control signal back to the primary ring access node 95. If these control signals are successfully received by the access node 95 and the secondary root node 99 then the connection 94 is maintained. In a similar way, the secondary back up node 98 is arranged to send control signal B,0 to the primary ring 91 in response to signal 0,0 from the primary ring. If these control signals are successfully received by the access node 95 and the secondary backup node 98 then the connection 93 is broken such that user packet data cannot cross this connection but control signals can.

If there is a connection between the primary and secondary rings then control signals enter the secondary ring only as a result of being passed on from the primary ring to the secondary ring via the secondary root node 99 or the secondary backup node 98. Normally only the secondary root node forwards control signals from the primary ring 91 into the secondary ring. However, if the secondary backup node does not receive any signal from the secondary backup node on either port then it forwards control signals from the primary ring 91 into the secondary ring, if it is able to receive these via connection 93.

If there is no connection between the primary and secondary rings (for example because of a fibre failure on connection 93) then the secondary root 99 and secondary backup 98 nodes function as normal primary root and backup nodes. That is, they launch their own control signals into the secondary ring. However, the secondary root and backup nodes then need to detect when the connection between the two rings has been re-established so that they can return to the appropriate behaviour pattern. This is done by creating two further rules:

Rule 9

If a secondary root node, when switched to normal behaviour, receives the control signal 0,N then it signals B,0 from both its ring ports.

Rule 10

If a secondary backup node, when switched to normal behaviour, receives the control signal 1,N then it signals B,0 from both its ring ports.

FIGS. 10a to 10f illustrate the two interconnected SDH rings of FIG. 9 and indicate how the improved spanning tree algorithm deals with a uni-directional fibre break in one of the connections between the two SDH rings. If there is a fault in one of the rings 91, 92 this is dealt with using the improved spanning tree algorithm as if the ring were a simple independent ring.

Figure 10A:
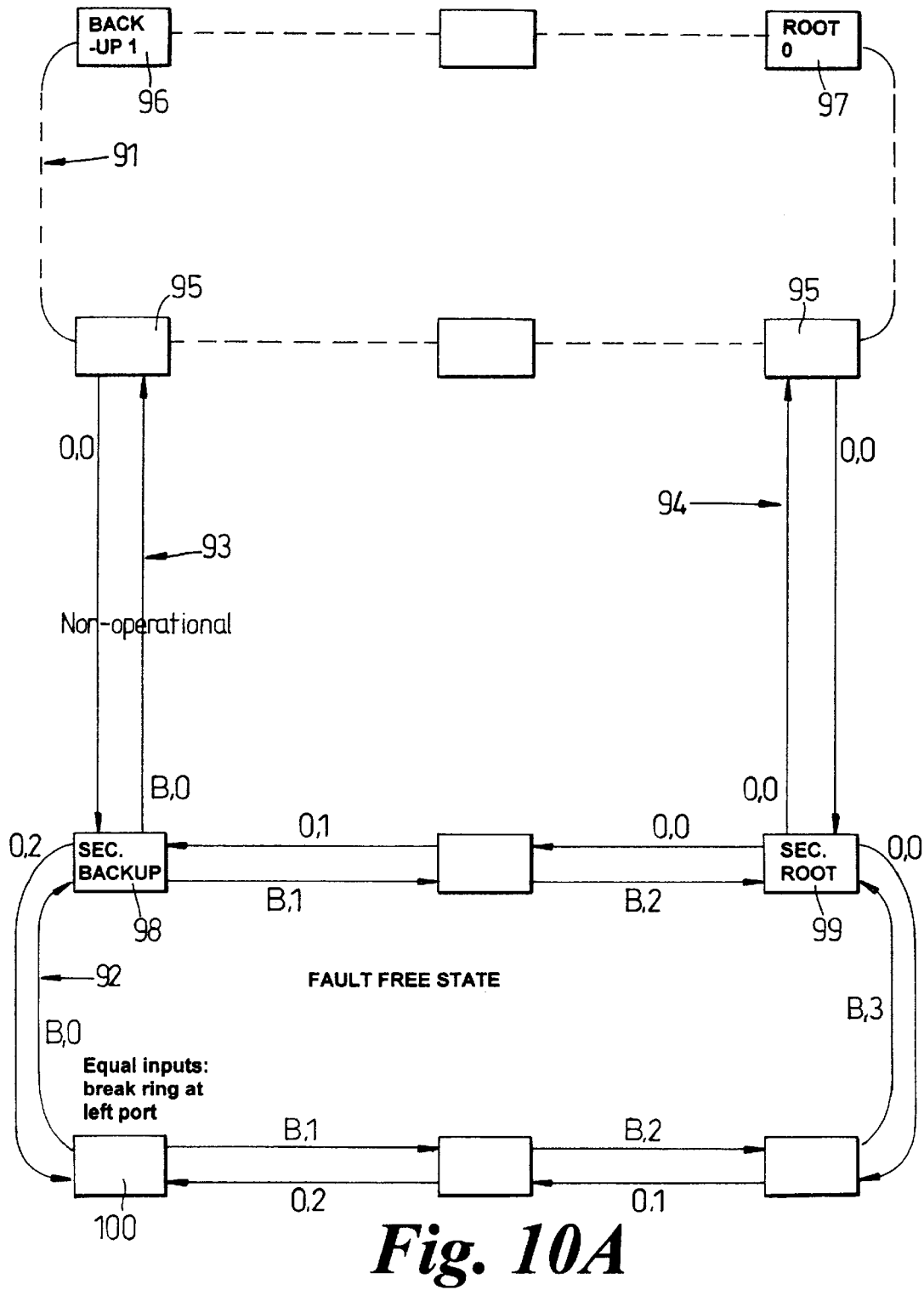
FIGS. 10a to 10f illustrate the two interconnected SDH rings of FIG. 9 and indicate how the improved spanning tree algorithm deals with a uni-directional fibre break in one of the connections between the two SDH rings.

FIG. 10a shows the situation before there is a fibre break. The improved spanning tree algorithm has taken effect to make connection 93 non-operational and to create a break at node 100 in the secondary ring 92. The break at node 100 was created following rule 1 because the inputs on both ports of node 100 were the same (in this case 0,2). The secondary root node 99 forwards control signals which propagate around the secondary ring as shown. Break control signals emanate from the break at node 100 and are also propagated around the secondary ring as shown.

Figure 10B:
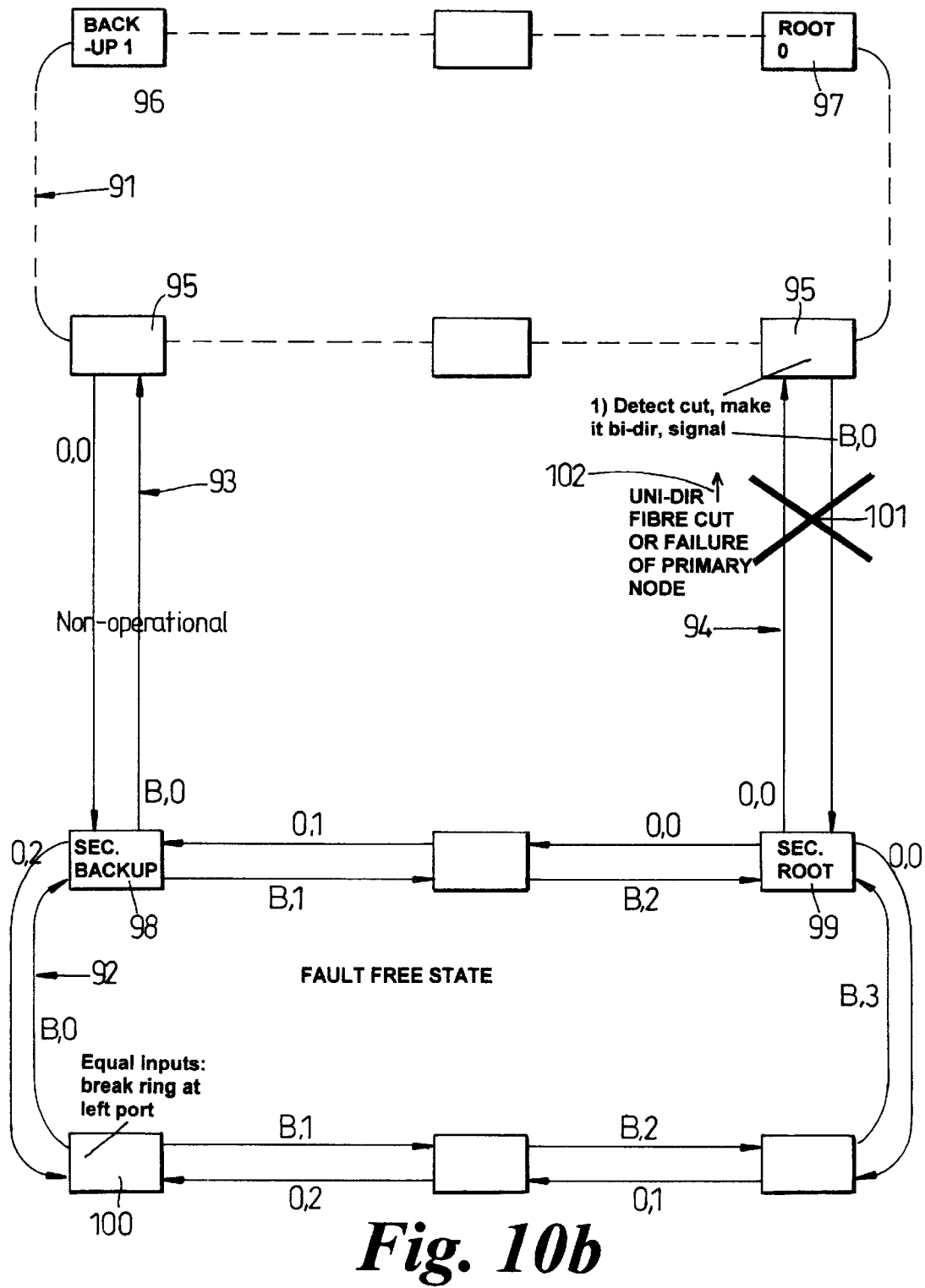
Figure 10C:
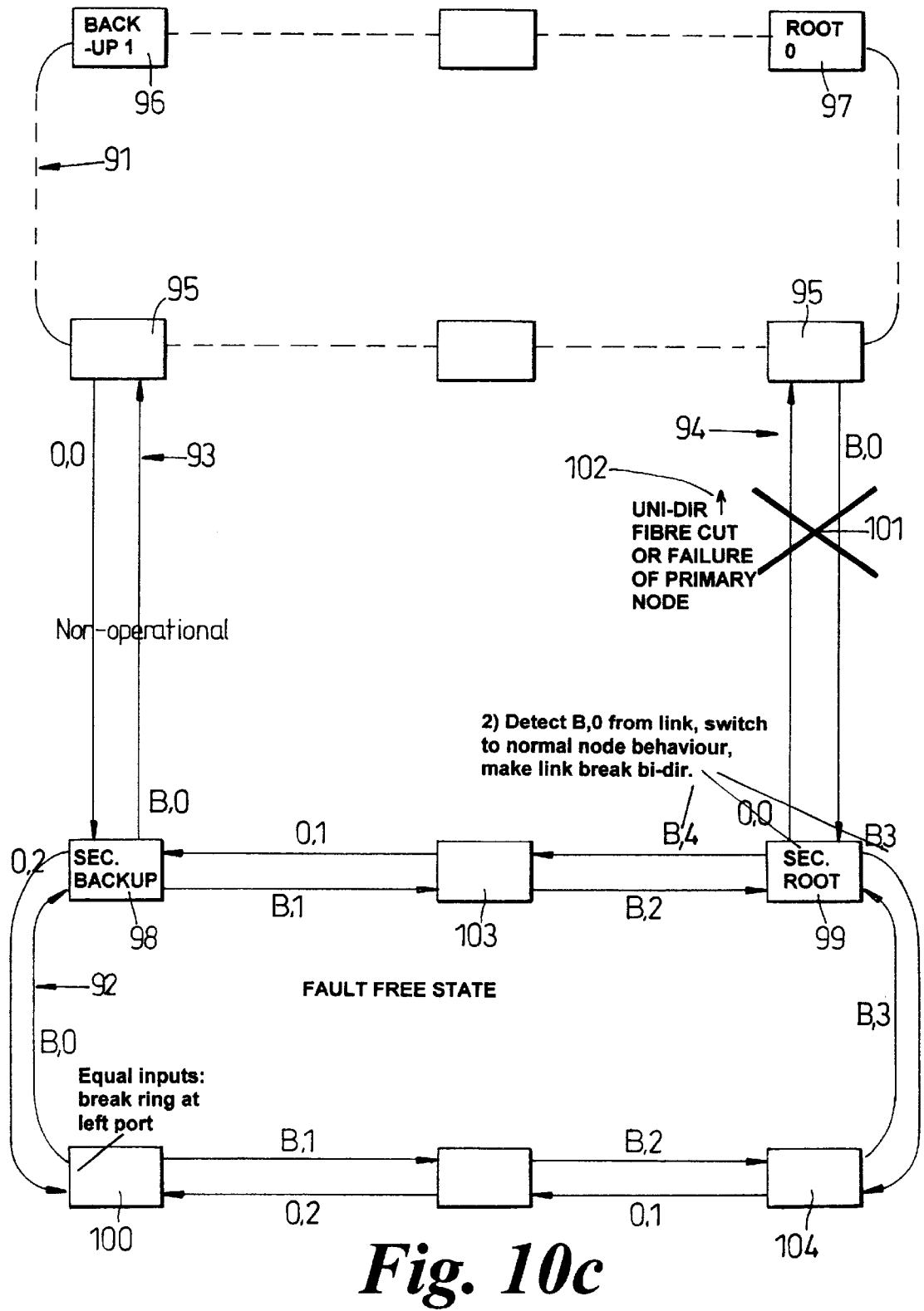

FIG. 10b is the same as FIG. 10a except that a uni-directional fibre break is shown at 101. This uni-directional fibre break 101 is such that communications cannot pass in the direction of arrow 102. Access node 95 detects the fibre break or loss of signal and following rule 2 it breaks the port which received this signal. This makes the fibre break 101 bi-directional in that user data cannot pass in either direction but control signals can pass from node 95 to the secondary root node 99. The secondary root node 99 detects control signal B,0 from the node 95 and therefore switches to normal root node behaviour. Also, following rule 1 it breaks the port that received the signal B,0 from node 95.

Because the secondary root node 99 has a broken port it does not launch its own control signals. It receives control signal B,2 from node 103 and therefore forwards control signal B,3 on to node 104. Node 104 sends control signal B,3 to the secondary root node 99 and the secondary root node forwards control signal B,4 to node 103.

Figure 10D:
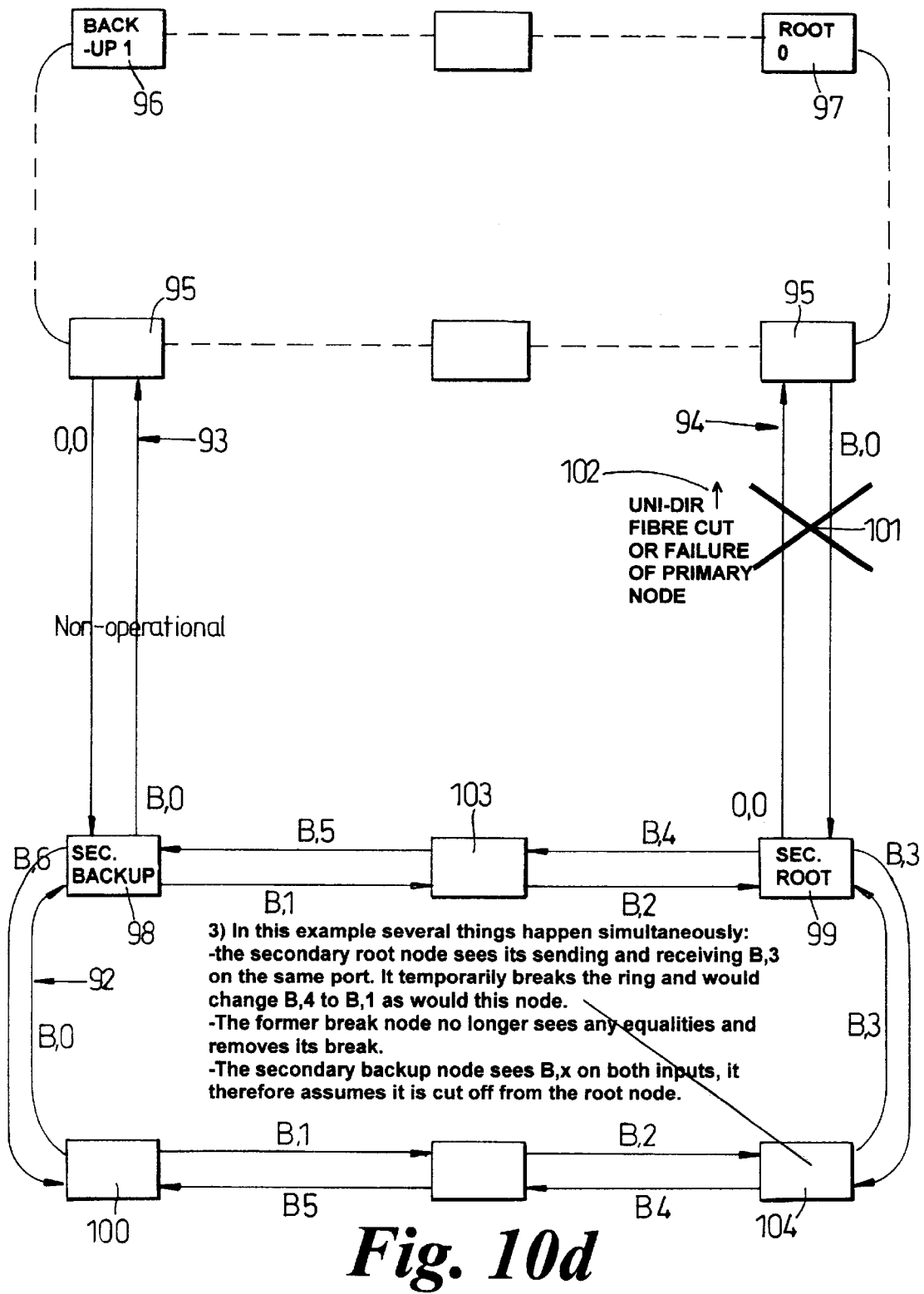
Figure 10E:
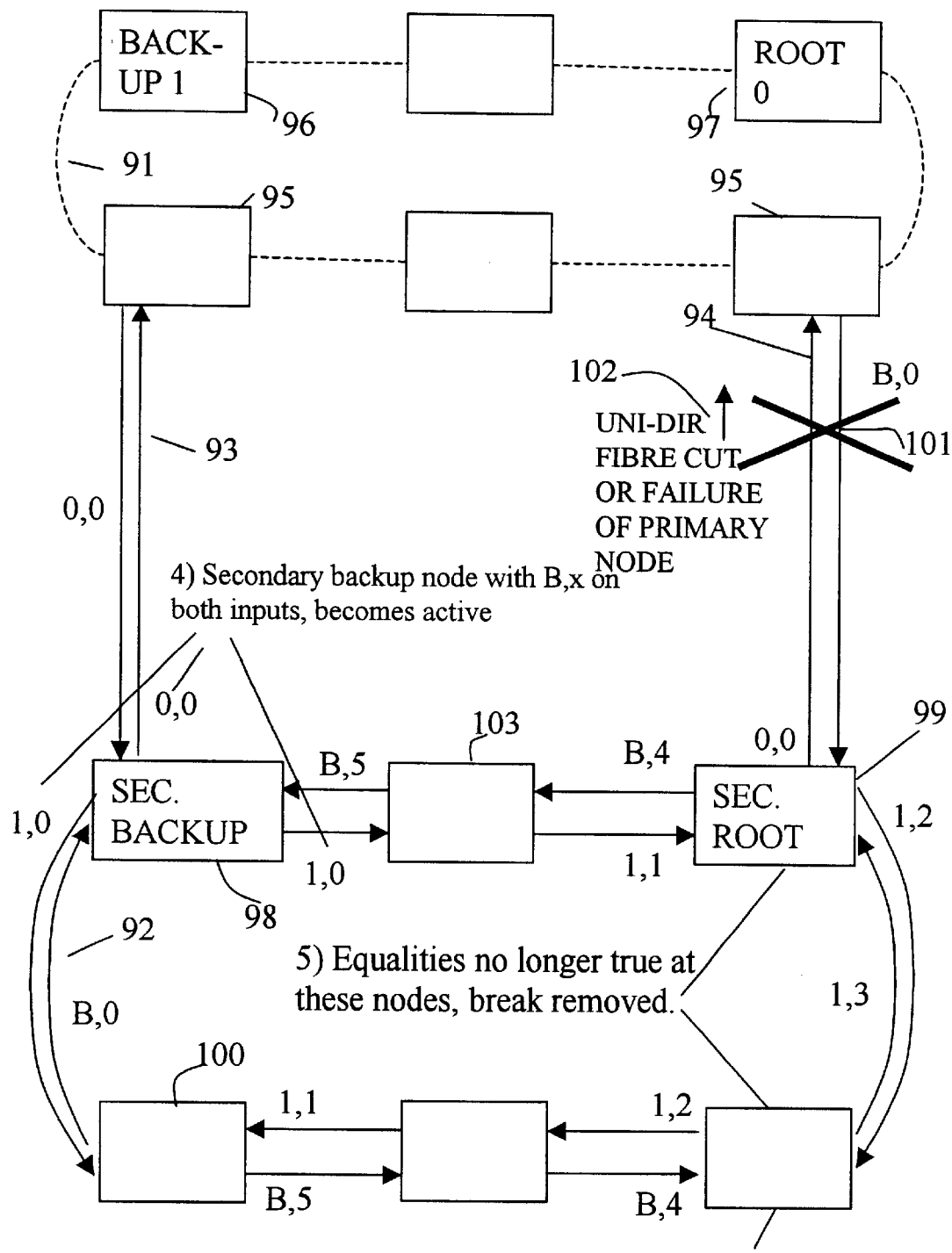

The next stage is illustrated in FIG. 10d. Here the secondary root node 99 and node 104 both receive control signal B,3 and also send out control signal B,3 from the same port. Following rule 3 these ports are broken. Also, node 100 no longer has identical control signal inputs on both its ports and so the break at this node is removed. The secondary backup node 98 does not receive any control signals that it can identify as being from a root node and so it assumes that it is cut off from the root node. Following rule 5 it therefore launches its own control signals as shown in FIG. 10e. The control signals launched by the backup node 98 propagate through the secondary ring 92 and this means that at nodes 99 and 104 the same control signals are no longer sent and received from the same port. The breaks at ports 99 and 104 are therefore removed.

Figure 10F:
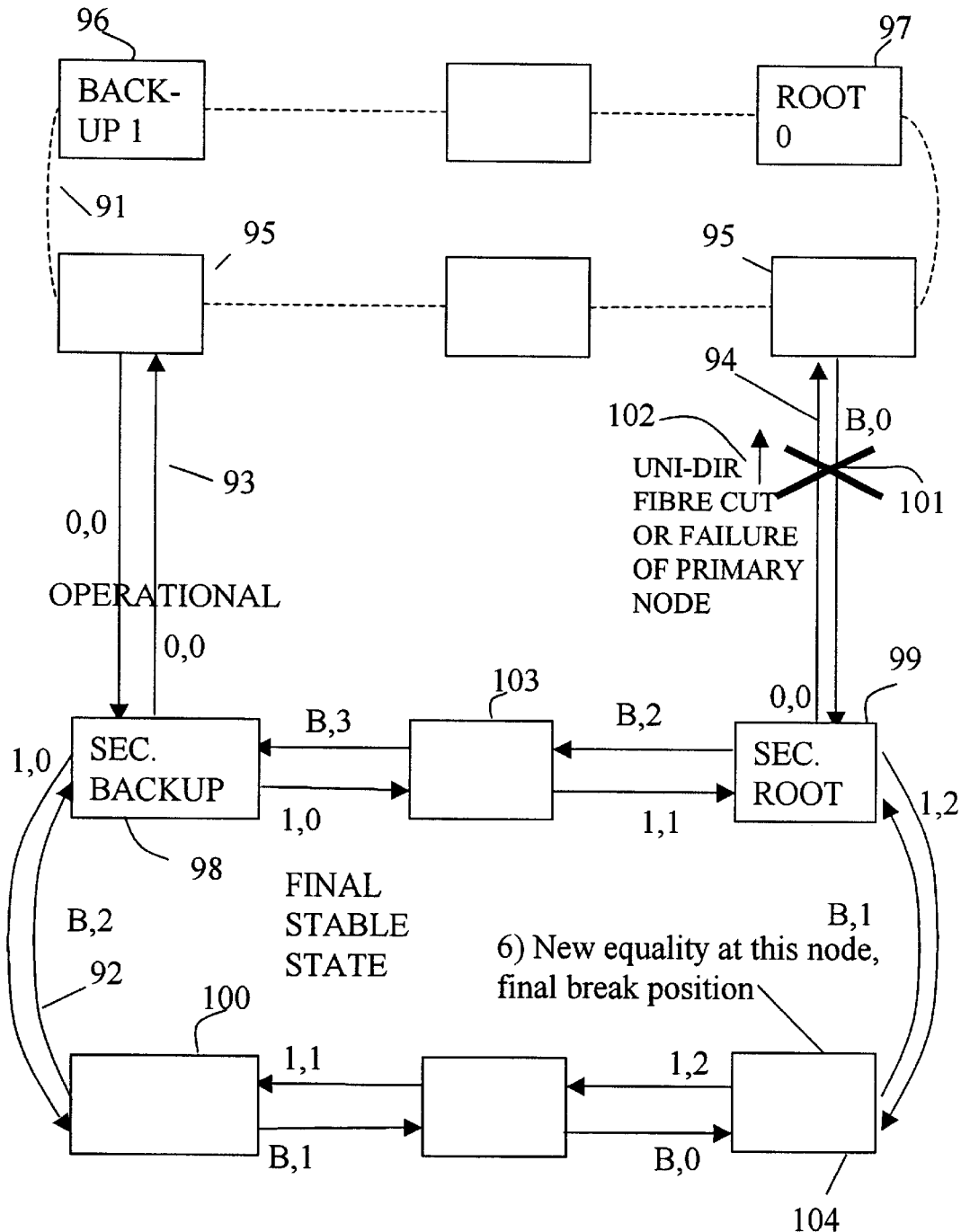

FIG. 10f shows how node 104 then receives the same control signal 1,2 at both of its ports. The connection 93 between the secondary backup node 98 and the primary ring 91 becomes operational because control signal 0,0 is successfully received by the secondary backup node 98 and access node 95. Following rule 1 a break is formed at node 104 and a final stable state is reached.

Figure 11:
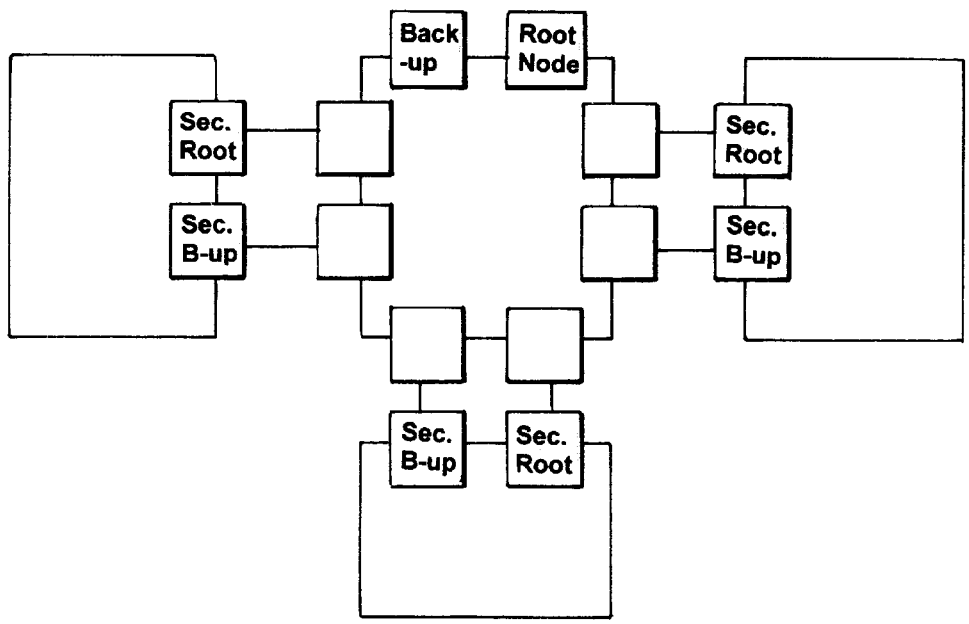
FIGS. 11 and 12 illustrate examples of network topologies that can be used with the improved spanning tree algorithm.
Figure 12:
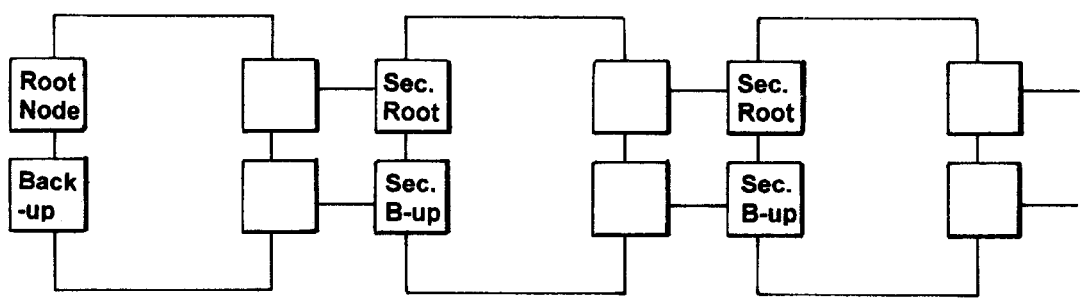

FIGS. 11 and 12 show examples of other network topologies that can be used with the improved spanning tree algorithm.

When data switching is incorporated in a telecommunications network it is usually possible to arrange the topology of the communications network to reflect some form of hierarchy which is readily assembled from basic building blocks of rings and arcs. The above examples show how by restricting the topology in this way it is possible to simplify the known spanning tree technique and still ensure that redundant routes are available to cater for network failures. Correction of routing tables after the use of the improved spanning tree algorithm to restore network connectivity after a fault.

Figure 13A:
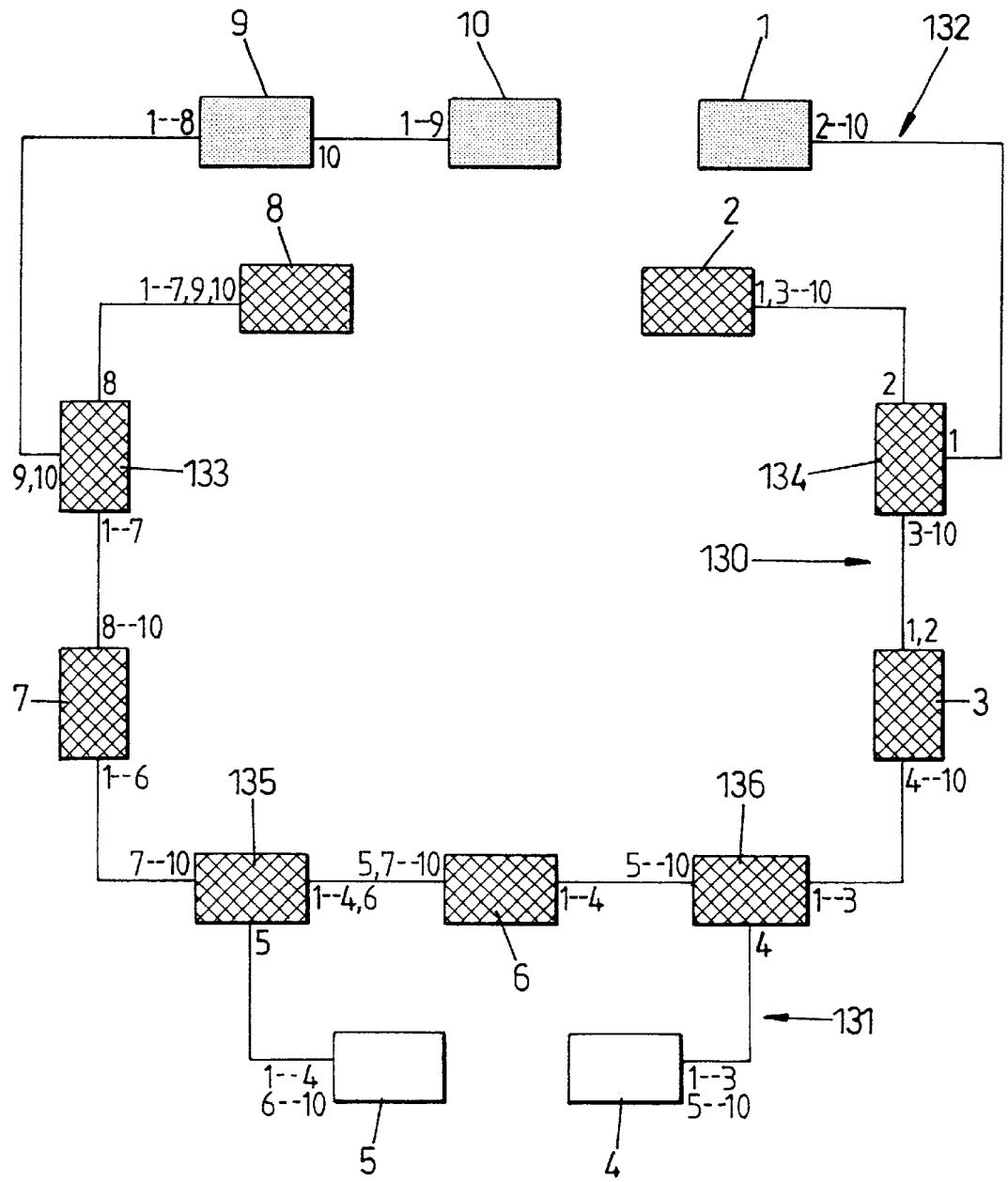
FIGS. 13a to 13e illustrate how routing table addresses can be corrected after the use of the improved spanning tree algorithm.

FIG. 13a shows a communications network after the improved spanning tree algorithm has taken effect. The network originally consisted of a central ring 130 with two arcs 131, 132 projecting from the ring. The spanning tree algorithm has taken effect to create a break in the ring and also in each of the arcs. These breaks are such that user data cannot flow through the break but control data can. The nodes in arc 132 (i.e. nodes 1, 9 and 10) are part of a multicast group or Vlan as defined in ITU standard 802.1Q. That is, control messages that are used for this part of the network do not propagate into other regions of the network. Similarly, nodes 4 and 5 are part of arc 131 and are a multicast group. Nodes 133, 134, 135 and 136 are arc access nodes and form another multicast group together with nodes 2, 3, 6, 7 and 8. The arc access nodes 133, 134,135 and 136 each have three ports whilst terminating nodes 1, 2, 4, 5, 8 and 10 each have only one functional port. The other nodes, 3, 6, 7, and 9 have two functional ports.

Each node contains a routing table which contains details about which of the node's ports to output information on given the destination address for the information. For example, node 10 is a terminating node and has only one functional connection to node 9. If node 10 receives information with a destination address for node 9 then this information is forwarded by node 10 onto its only output. Similarly, if node 10 receives information with any of the destination addresses for nodes 1 to 9 then this information is to be output on node 10's only port. This is indicated in FIG. 13a by the numbers 1–9 being written next to node 10's port. For node 9, if information is received for any of nodes 1 to 8 this is output on the left port of node 9. If node 9 receives information for node 10 this is output on the right port of node 9. Therefore, the number 10 is written above the right port of node 9 in FIG. 13a and the numbers 1–8 are written above the left port of node 9. Similarly numbers are written next to all the ports in FIG. 13a. These numbers will be referred to as routing addresses.

Figure 13B:
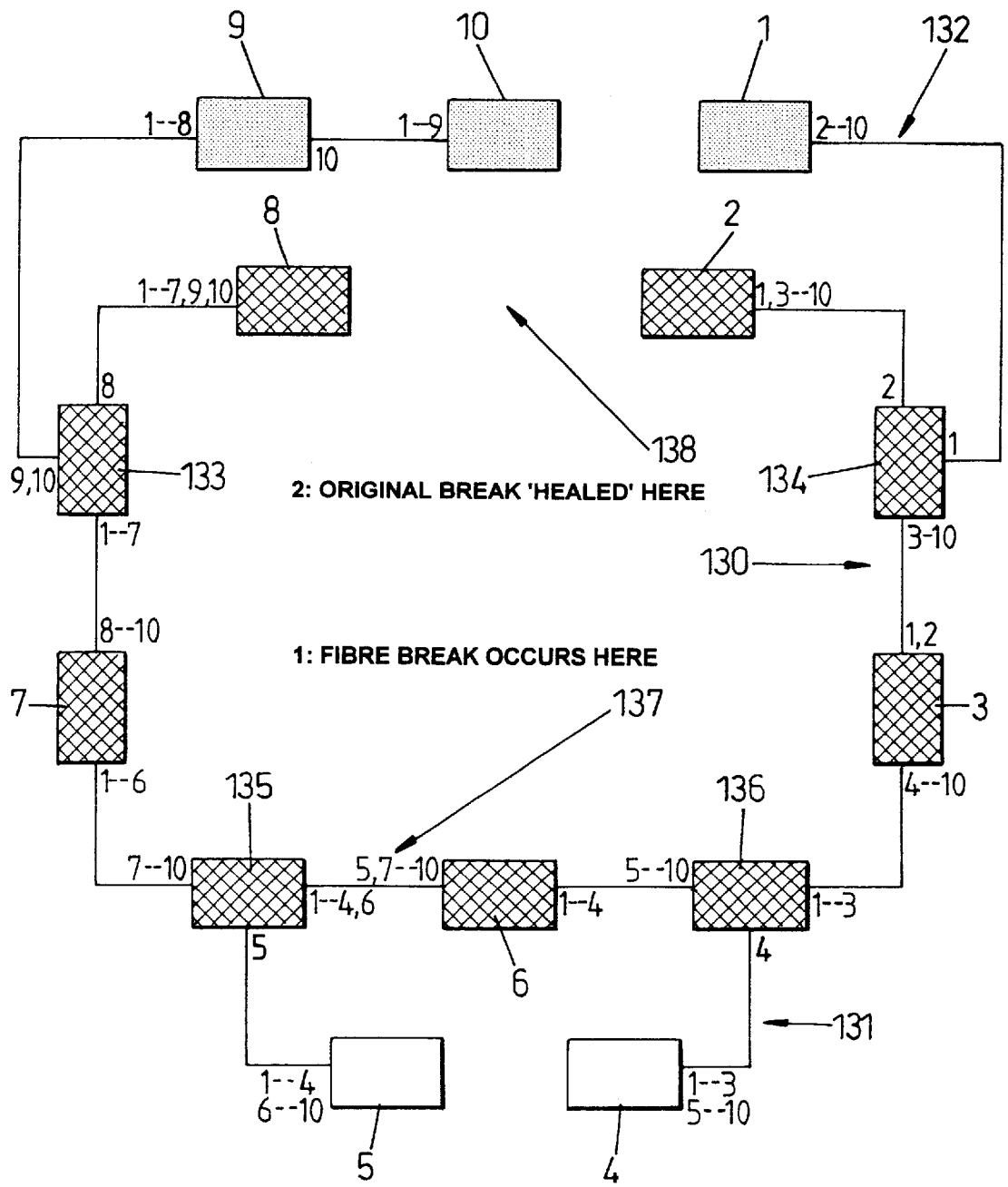
Figure 13C:
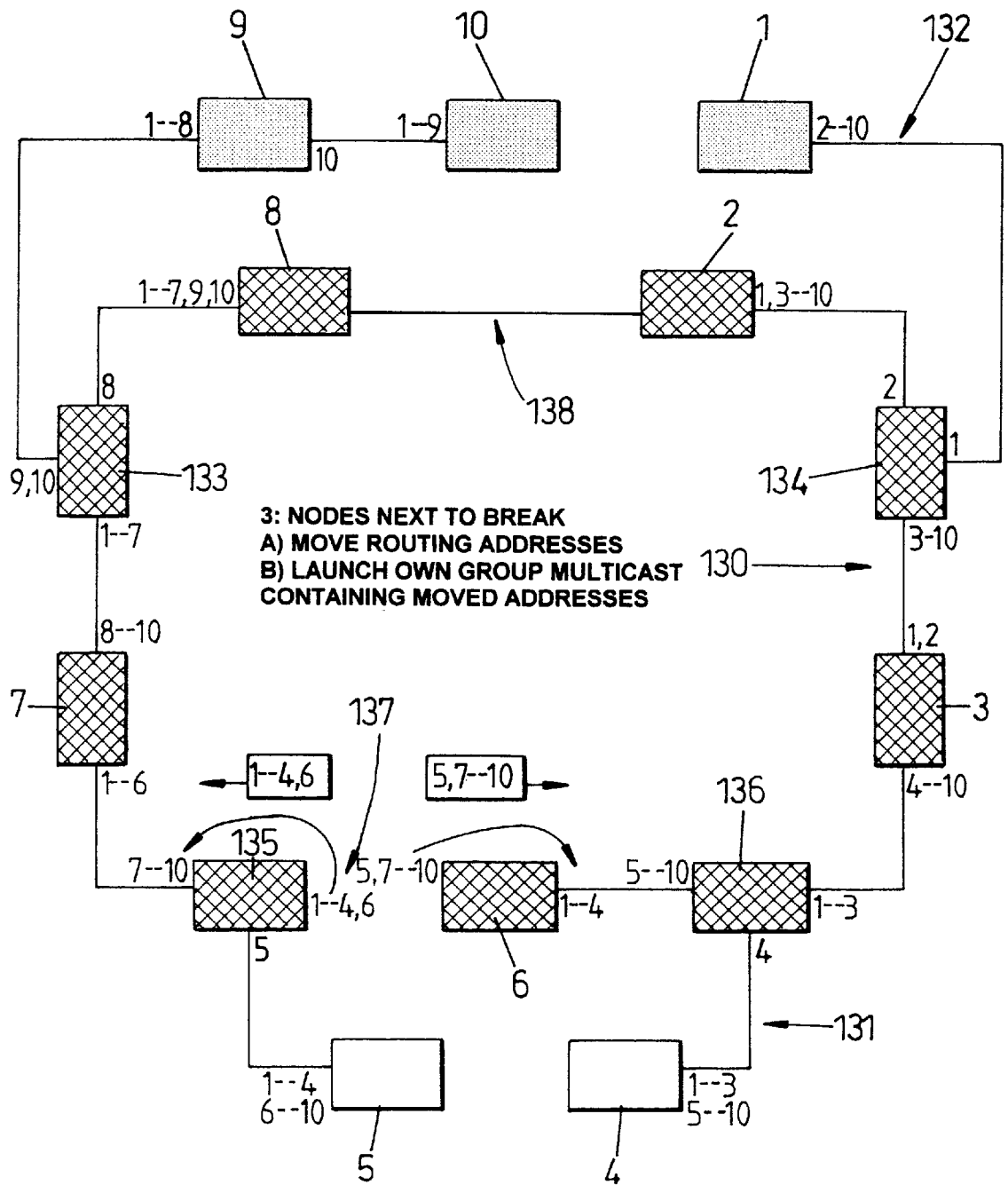

FIG. 13b is the same as FIG. 13a except that a fibre break is represented at 137. Also the fact that the improved spanning tree algorithm has previously created a break at 138 is indicated. This break at 138 is "healed" or removed as a result of the improved spanning tree algorithm taking effect once the fibre break at 137 occurs. This is shown in FIG. 13c. The routing addresses in FIG. 13c are the same as for FIG. 13b and it can be seen that because of the new configuration of the network these routing addresses are no longer correct. For example, if arc access node 135 receives a message that is addressed to node 4 the routing address indicates that this message should be output on the right port of node 135 and yet this port is broken. Also nodes 2 and 8 have no routing addresses on their re-established ports at either side of the site of the healed break 138.

In order to update the routing addresses quickly the nodes next to the break 137 are arranged to move the routing addresses from their broken ports to the remaining port that is not an arc access port. Then the nodes next to the break 137 launch multicast control signals to the rest of the nodes in the ring 130. These multicast control signals contain information about the moved addresses.

An additional rule is then implemented as follows:
Rule 11

Figure 13D:
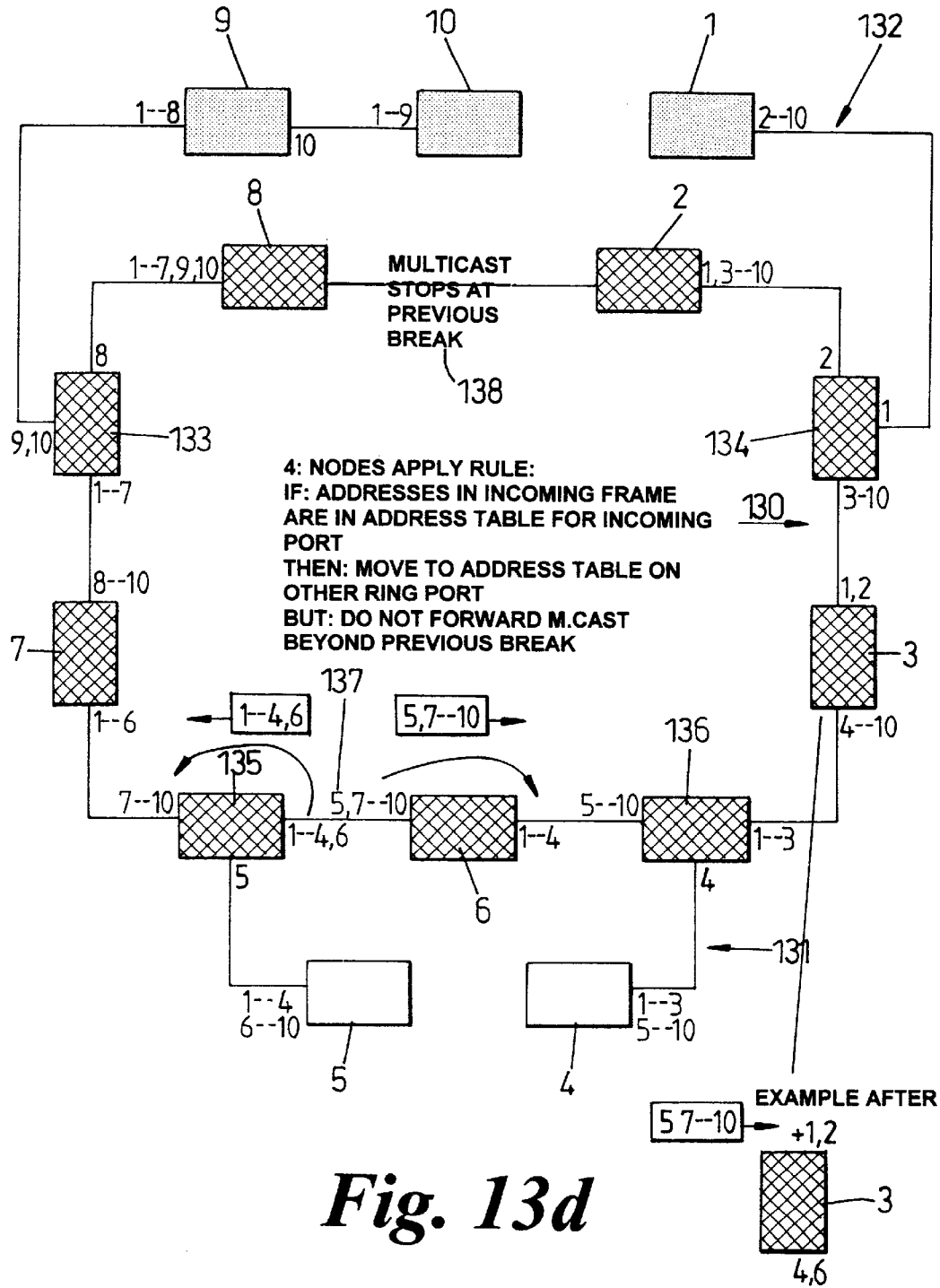
Figure 13E:
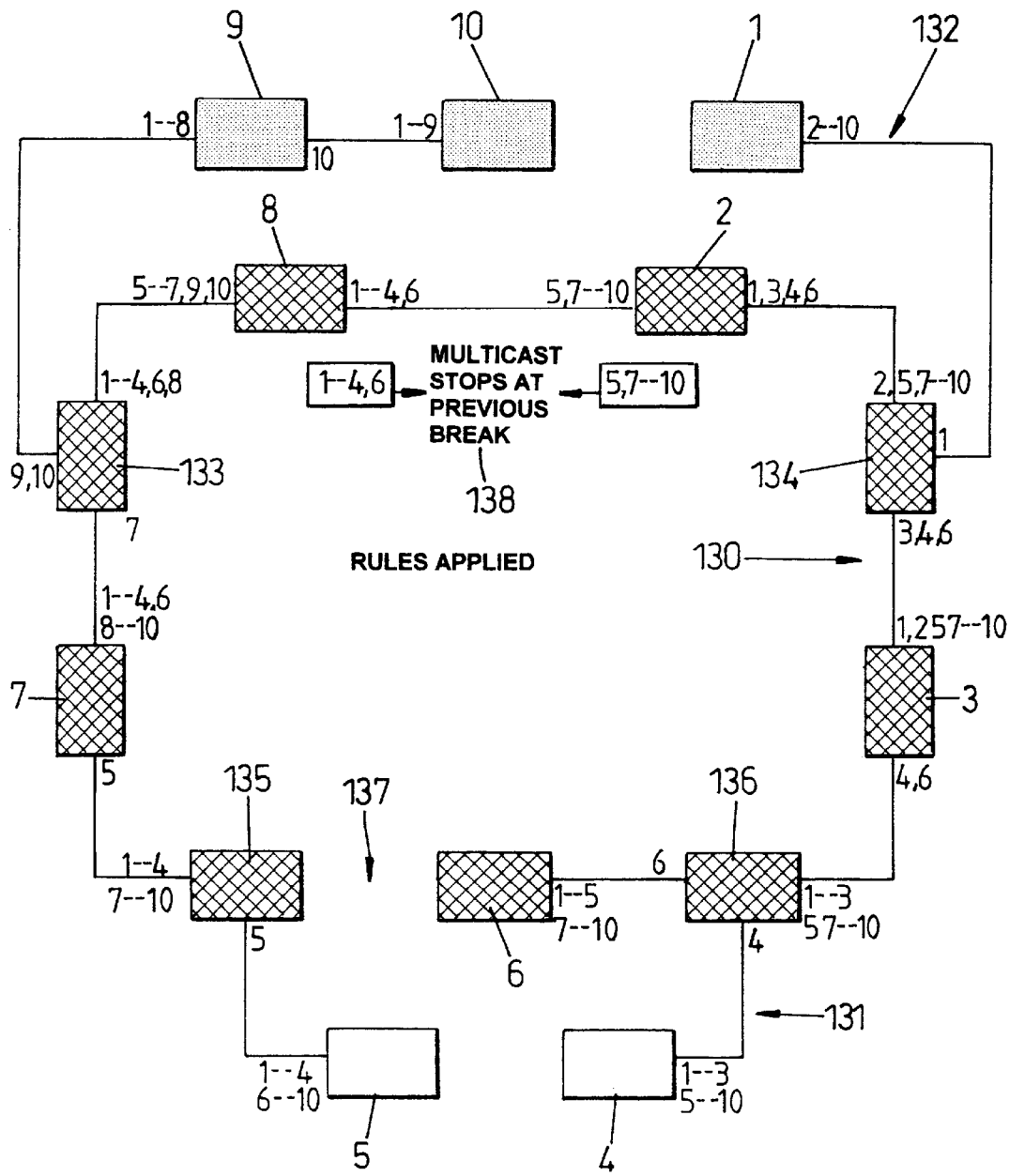

If the "moved routing addresses" received by a node are already in the routing table for that node's incoming port then move these addresses on to the routing table for the node's other ring port. However, do not forward the "moved routing addresses" on beyond the "healed" break. This rule is illustrated in FIGS. 13d and 13e.

For node 135 the routing addresses on the broken port are moved to the remaining port for that node that is not an arc access port. This means that routing addresses 1 to 4 and 6 are moved from the broken port of node 135 to the opposite port. The ring port for node 135 then has routing address entries for addresses 1 to 4 and 7 to 10 as shown in FIG. 13e. The moved addresses are then multicast within ring 130. This means that node 7 receives a control signal containing information about the moved addresses 1 to 4 and 6. Following rule 11, node 7 checks to see if these moved addresses are in its routing table for the port that received the moved addresses. This is the case (in FIG. 13d, node 7 has routing 15 address numbers 1 to 6 on the port that connects to node 135). Following rule 11, the moved routing table addresses are removed from the port on node 7 that received them and moved to the other port of node 7. Thus in FIG. 13e the port on node 7 that is connected to node 135 has only the routing table address for node 5. This process continues along ring 130 but the multicast messages stop at the previous break 138 following rule 11. This is illustrated in FIG. 13e.

For node 6 the addresses from the broken port are moved to the opposite port and then multicast signals containing these moved addresses are propagated around ring 130. Rule 11 is followed and this allows the routing table addresses for each node to be updated quickly. Eventually a new stable state is reached as shown in FIG. 13e.

Figure 14:
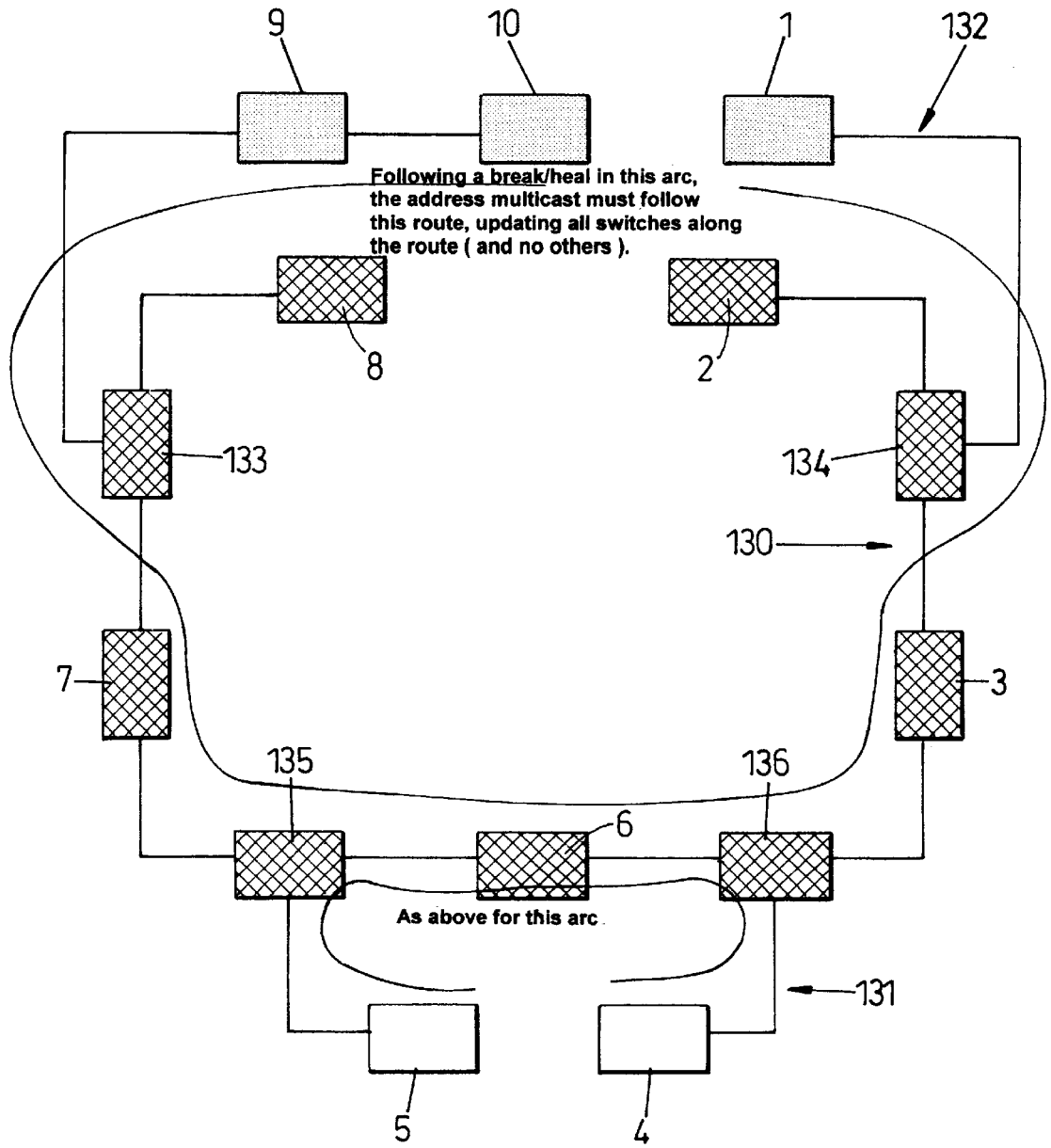
FIG. 14 illustrates how routing table addresses can be corrected in arcs after the use of the improved spanning tree algorithm.

In order to extend the address updating scheme to arcs as well as rings the same process is followed except that the multicast signals which contain information about which routing table addresses have been moved are broadcast only to the following nodes: the arc nodes; the arc access nodes; and the nodes from the main ring which form the shortest path between the arc access nodes. This is illustrated in FIG. 14 where for arc 132 a break existed as a result of the improved spanning tree algorithm. A real fibre break then occurred in arc 132 and as a result the break formed as a result of the improved spanning tree algorithm was "healed". This resulted in only one break being present in arc 132 and with routing tables that required updating. The routing tables are then updated using rule 11 as described above except that the multicast messages are broadcast only to nodes 10, 9, 133, 7, 135, 6, 136, 3, 134 and 1. This is because these nodes include the arc nodes 10, 9 and 1 for arc 132; the arc access nodes 133 and 134 and the nodes from the main ring 130 which form the shortest path between the arc access nodes. These nodes are 7, 135, 6, 136, and 3. Similarly, if a break occurs in arc 131 and the routing tables require updating, multicast messages are broadcast only to nodes 5, 135, 6, 136 and 4.

Preferably, the rules and method described herein for the improved spanning tree algorithm are encoded as computer software or as a communications protocol. Any suitable programming language can be used as is known to a skilled person in the art.

FIG. 1 shows a flow diagram for an example of a computer program for implementing the improved spanning tree algorithm and controlling a communications network. Box 1000 of FIG. 1 indicates how control signals are sent between nodes in a communications network. The computer program implements rules 1 and 3 as shown in boxes 1001 and 1002 respectively. That is, if control signals received by two ports on a node are identical, one of the two ports is blocked to user broadcast messages. Also, if identical control signals are simultaneously output from and input to a port, that port is blocked to user broadcast messages. The computer program also implements the other rules and conditions of the method in any suitable way as is known to a skilled person in the art.

A range of applications are within the scope of the invention. These include situations in which it is required to prevent or reduce the possibility of packet looping occurring in a communications network. For example, when data switching is incorporated into a wide area telecommunications network and a network protocol is used which allows network resources to be shared. This includes the situation when data is communicated with an SDH communications network. The invention also encompasses computer programs for controlling these types of communications networks and the communications networks themselves.

What is claimed is:

1. A method of preventing looping of user broadcast messages in a communications network, said communications network comprising a plurality of nodes, each node having two ports, said ports being connected by links to form a ring of nodes, said method comprising the steps of:
   i. sending control signals between nodes in said communications network, each control signal comprising information about which node the control signal originated from and how many nodes have been passed in the ring since that control signal originated;
   ii. blocking one of the ports on a node to user broadcast messages if control signals received by two ports on that node are identical; and
   iii. blocking a port to user broadcast messages if identical control signals are simultaneously output from and input to that port; such that in use said ring of nodes is effectively a tree structure for the propagation of user broadcast messages and looping of user broadcast messages around the ring is prevented.

2. A method as claimed in claim 1 wherein one of the nodes in said ring is a root node from which control signals are always launched unless the root node is broken.

3. A method as claimed in claim 2 wherein another of the nodes in said ring is a backup node from which control signals are only launched if the back up node received no signal from the root node on either of its two ports.

4. A method as claimed in claim 1 wherein if one of the ports on a node is broken then a control signal is launched from said broken port.

5. A method as claimed in claim 4 which further comprises the step of launching a control signal from the other port of said node, said control signal comprising information that one node in the ring has been passed since that control signal originated.

6. A method as claimed in claim 4 which further comprises the step of blocking a port if that port receives a control signal launched by a broken port, where that control signal indicates that no nodes in the ring have been passed since that control signal originated.

7. A method as claimed in claim 1 wherein said communications network further comprises a plurality of arc nodes, each arc node having two ports, said ports being connected by links to form a chain, the arc node at each end of said chain being connected to an arc access node in said ring.

8. A method as claimed in claim 7 wherein the arc access nodes are arranged such that control signals are not forwarded from the arc access nodes into the ring.

9. A method as claimed in claim 7 wherein the arc access nodes are arranged such that if an arc access node receives a control signal from a root node or a backup node then that control signal is forwarded to a first arc node in said chain after the information in said control signal about how many nodes have been passed in the ring since that control signal originated is adjusted.

10. A method as claimed in claim 1 which further comprises the step of unblocking said blocked port to user broadcast messages, in the event that a fault occurs in said communications network.

11. A method as claimed in claim 10 wherein one or more routing addresses are associated with each port, each routing address comprising information about which of a node's ports to output a user broadcast message from on the basis of a destination address for that user broadcast message.

12. A method as claimed in claim 11 which further comprises the step of updating said routing addresses in the event that a fault occurs in said communications network and said blocked port is unblocked to user broadcast messages.

13. A method as claimed in claim 12 wherein said step of updating said routing addresses comprises taking the routing addresses for each port next to said fault and associating them with another port on the same node.

14. A method as claimed in claim 13 wherein said step of updating routing addresses further comprises arranging the nodes next to said fault to launch control signals which comprise information about the re-associated routing addresses.

15. A computer program stored on a computer readable medium said computer program being for controlling a communications network comprising a plurality of nodes, each node having two ports, said ports being connected by links to form a ring of nodes, said computer program being arranged to control said communications network such that:

control signals are sent between nodes in said communications network, each control signal comprising information about which node the control signal originated from and how many nodes have been passed in the ring since that control signal originated;

ii. one of the ports on a node is blocked to user broadcast messages if control signals received by two ports on that node are identical; and iii. a port is blocked to user broadcast messages if identical control signals are simultaneously output from and input to that port; such that in use said ring of nodes is effectively a tree structure for the propagation of user broadcast messages and looping of user broadcast messages around the ring is prevented.

16. A communications network comprising a plurality of nodes, each node having two ports, said ports being connected by links to form a ring of nodes, wherein:

i. said nodes are arranged to send control signals via said links, each control signal comprising information about which node the control signal originated from and how many nodes have been passed in the ring since that control signal originated;

ii. said ports are arranged to be blocked to user broadcast messages if control signals received by two ports on a node are identical; and iii. said ports are also arranged to be blocked to user broadcast messages if identical control signals are simultaneously output from and input to a port; such that in use said ring of nodes is effectively a tree structure for the propagation of user broadcast messages and looping of user broadcast messages around the ring is prevented.

17. A communications network as claimed in claim 16 wherein said ring is a synchronous digital hierarchy ring.

18. A communications network as claimed in claim 17 which is a wide area telecommunications network.

19. A communications network as claimed in claim 18 which is arranged to communicate data.

\* \* \* \* \*